US012701385B2

(12) United States Patent
Fan et al.

(10) Patent No.: US 12,701,385 B2
(45) **Date of Patent: \*Aug. 4, 2026**

(54) METHOD AND SYSTEM FOR SPATIAL AUDIO METERING USING EXTENDED REALITY DEVICES

(71) Applicant: Sphere Entertainment Group, LLC, New York, NY (US)

(72) Inventors: Yuan-Yi Fan, New York, NY (US); Neil Wakefield, New York, NY (US)

(73) Assignee: Sphere Entertainment Group, LLC, New York, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 19/173,500

(22) Filed: Apr. 8, 2025

(65) Prior Publication Data

US 2025/0240597 A1    Jul. 24, 2025

Related U.S. Application Data

(63) Continuation of application No. 18/423,828, filed on Jan. 26, 2024, now Pat. No. 12,317,066, which is a continuation of application No. 18/114,089, filed on Feb. 24, 2023, now Pat. No. 11,902,773.

(51) Int. Cl.
| | |
|---|---|
| *G06F 3/01* | (2006.01) |
| *G06T 15/08* | (2011.01) |
| *G06T 19/00* | (2011.01) |
| *H04S 7/00* | (2006.01) |

(52) U.S. Cl.
CPC ............... *H04S 7/40* (2013.01); *G06F 3/011* (2013.01); *G06T 15/08* (2013.01); *G06T*

*19/006* (2013.01); *H04S 7/30* (2013.01); *G06T 2219/004* (2013.01); *H04S 2400/15* (2013.01)

(58) Field of Classification Search
CPC .......... H04S 7/40; H04S 7/30; H04S 2400/15; G06F 3/011; G06T 15/08; G06T 19/006; G06T 2219/004
See application file for complete search history.

(56) References Cited

U.S. PATENT DOCUMENTS

| | | | |
|---|---|---|---|
| 5,210,802 | A | 5/1993 | Aylward |
| 11,205,303 | B2 * | 12/2021 | Schowengerdt ........ G06F 3/011 |
| 11,902,773 | B1 | 2/2024 | Fan et al. |

(Continued)

OTHER PUBLICATIONS

Ahnert Feistel Media Group, "EASE Focus Version 3—User's Guide" A Simulation Software by AFMG, Feb. 28, 2019, XP093072376; 82 pages.

(Continued)

*Primary Examiner* — Amr A Awad
(74) *Attorney, Agent, or Firm* — Sterne, Kessler, Goldstein & Fox P.L.L.C.

(57) ABSTRACT

Provided herein are system, method, and computer program product embodiments for providing an interactive visual representation of loudspeaker sound coverage in a venue. An embodiment enables temporal, spectral, and spatial audio metering from digital audio to venue acoustics. This technology can visualize audio capabilities of one or more loudspeaker arrays using light to provide visualization grouping of large audio channel outputs. This can allow spatial information to be visually represented by mapping directional sound to light beams.

20 Claims, 9 Drawing Sheets

(56) References Cited

U.S. PATENT DOCUMENTS

| | | | |
|---|---|---|---|
| 11,956,624 | B2 | 4/2024 | Fan et al. |
| 12,317,066 | B2 | 5/2025 | Fan et al. |
| 2006/0117261 | A1 | 6/2006 | Sim et al. |
| 2012/0041579 | A1 | 2/2012 | Davis et al. |
| 2012/0047435 | A1 | 2/2012 | Holladay et al. |
| 2012/0133899 | A1* | 5/2012 | Chiang ................. H04N 9/315 |
| | | | 353/31 |
| 2019/0116448 | A1* | 4/2019 | Schmidt .................... G06F 3/01 |
| 2020/0053320 | A1* | 2/2020 | Mor ......................... H04N 7/18 |
| 2020/0187332 | A1 | 6/2020 | Mizerak et al. |
| 2020/0312033 | A1 | 10/2020 | Ohashi |
| 2020/0326784 | A1 | 10/2020 | Isaacs et al. |
| 2021/0008413 | A1* | 1/2021 | Asikainen ............. G06F 3/0304 |
| 2021/0011544 | A1* | 1/2021 | Robertson .............. G16H 40/67 |
| 2021/0011551 | A1* | 1/2021 | Andersson ........... G06V 10/141 |
| 2021/0011559 | A1* | 1/2021 | Mutlu ................... G06F 3/0304 |
| 2021/0084429 | A1* | 3/2021 | Tajik .................. G02B 27/0093 |
| 2022/0329765 | A1* | 10/2022 | Shanmugam ........ H04N 9/3194 |
| 2023/0232153 | A1 | 7/2023 | Sørensen et al. |
| 2024/0015467 | A1 | 1/2024 | Fan et al. |
| 2024/0048674 | A1* | 2/2024 | Mohar Castillo ....... B60R 11/00 |
| 2024/0276173 | A1 | 8/2024 | Fan et al. |

OTHER PUBLICATIONS

D&b Audiotechnik Gmbh: "TI 385 (4.2 EN) d&b Line array design, ArrayCalc V7.x", Mar. 1, 2014 (Mar. 1, 2014), XP055495833, 58 pages.

Feistel et al., "Adapting Loudspeaker Array Radiation to the Venue using Numerical Optimization of FIR Filters," Convention paper 8937, Audio Engineering Society, Presented at the 135th Convention, Oct. 17-20, 2013, New York, USA, XP093164798; 10 pages.

International Search Report and Written Opinion for Application No. PCT/US2023/074906, mailed on Feb. 4, 2024, 14 pages.

International Search Report and Written Opinion for Application No. PCT/US2024/017014, mailed on Jun. 7, 2024, 10 pages.

* cited by examiner

700

702 — RETRIEVE DIGITAL AUDIO

704 — MAP THE DIGITAL AUDIO ONTO A VIRTUAL MODEL TO PREVISUALIZE A VIRTUAL EVENT

706 — COMPARE THE VIRTUAL EVENT BETWEEN STUDIO LAYOUT AND VENUE LAYOUT

708 — GENERATE A VIRTUAL EVENT VIEW FOR A MIXED REALITY OVERLAY AT THE VENUE

710 — VIRTUALLY INTERACT WITH THE VIRTUAL EVENT TO CONFIGURE, MEASURE, AND/OR MODIFY THE VENUE AUDIO

METHOD AND SYSTEM FOR SPATIAL AUDIO METERING USING EXTENDED REALITY DEVICES

CROSS-REFERENCE TO RELATED APPLICATIONS AND INCORPORATION BY REFERENCE

The application is a continuation of U.S. patent application Ser. No. 18/423,828 filed Jan. 26, 2024, now allowed, which is a continuation of U.S. patent application Ser. No. 18/114,089 filed on Feb. 24, 2023, now U.S. Pat. No. 11,902,773, the contents of which are incorporated by reference in their entireties.

BACKGROUND

Conventional spatial audio metering methods for large venues can become more time-consuming and logistics-demanding as new spatial audio technologies enable more control options for directional sound. For example, spatial audio metering at a large venue with a high channel count can encounter numerous hindrances to configuring directional sound output from a single location only by listening with the human ear. These hindrances arise from current sound production workflows and are categorized into three groups: temporal metering (e.g. loudness), spectral metering (e.g. frequency spectrum), and spatial metering (e.g. coverage). A hindrance to temporal metering is a lack of confidence in loudness across review sites, studios, and headphones. A hindrance spectral metering is a lack of tools to match spectral content to a loudspeaker's or loudspeaker array's output capabilities. A hindrance to spatial metering is a lack of clear visual aids in authoring spatial audio content, in tuning for studio-venue translation, and in calibrating large venue playback systems. As a result, skilled artisans face challenges with configuring an audio system and measuring an audio performance in person, especially during planning or construction phases of a venue.

DETAILED DESCRIPTION OF THE INVENTION

Figure 1:
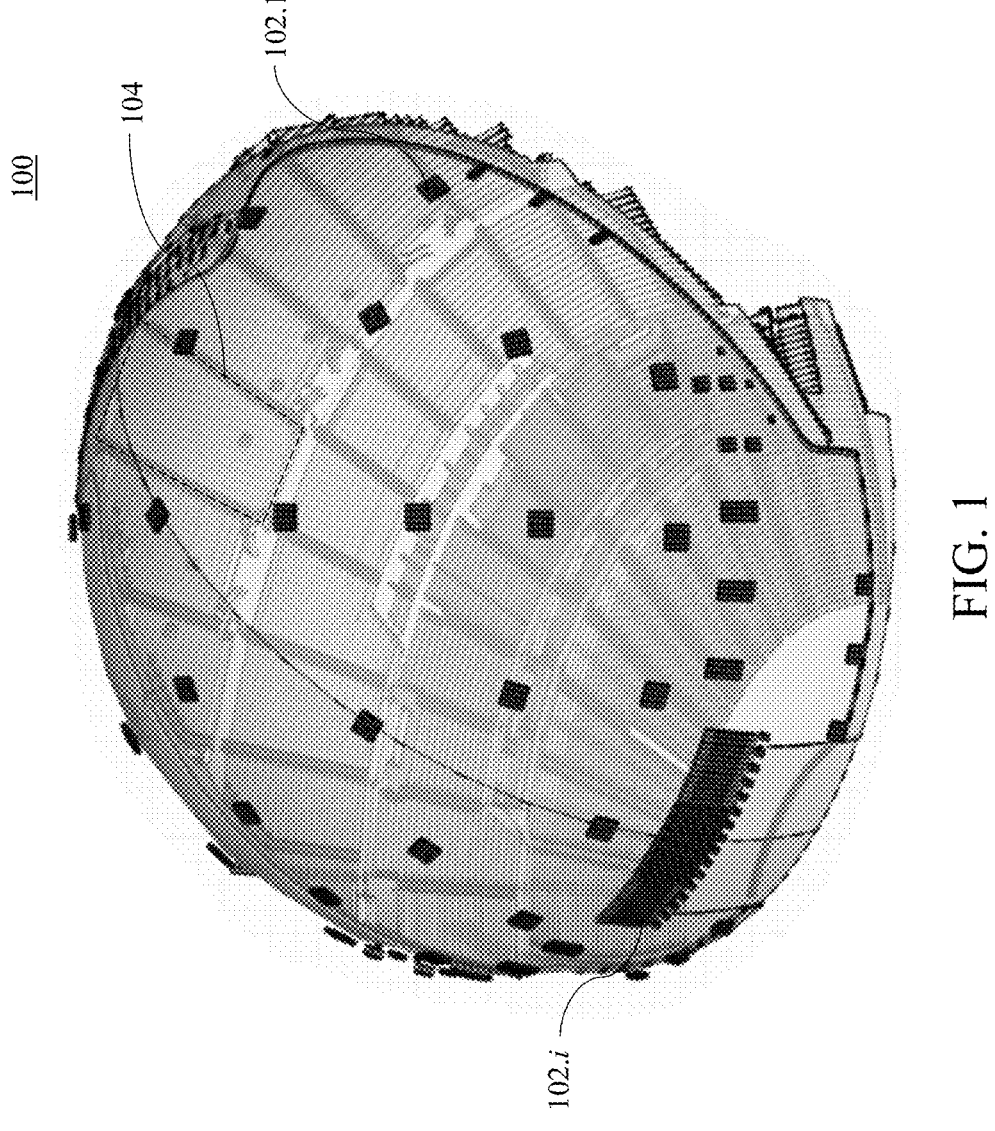
FIG. 1 illustrates a pictorial representation of an exemplary venue according to some embodiments.

The following disclosure provides many different embodiments, or examples, for implementing different features of the provided subject matter. Specific examples of components and arrangements are described below to simplify the present disclosure. These are, of course, merely examples and are not intended to be limiting. In addition, the present disclosure can repeat reference numerals and/or letters in the various examples. This repetition does not in itself dictate a relationship between the various embodiments and/or configurations discussed.

Overview

Provided herein are system, apparatus, device, method, and/or computer program product embodiments, and/or combinations and sub-combinations thereof, for providing an interactive visual representation of loudspeaker sound coverage in a venue. In some embodiments, the technology described herein can enable temporal, spectral, and spatial audio metering from digital audio to venue acoustics. This technology can visualize audio capabilities of one or more loudspeaker arrays using light to provide visualization grouping of large audio channel outputs. This can allow spatial information to be visually represented by mapping directional sound to light beams.

Exemplary Venue

FIG. 1 illustrates a pictorial representation of an exemplary venue according to some exemplary embodiments of the present disclosure. In some embodiments, a venue 100 represents a location for hosting an event. For example, the venue 100 can represent a music venue, for example, a music theater, a music club, and/or a concert hall, a sporting venue, for example, an arena, a convention center, and/or a stadium, and/or any other suitable venue that will be apparent to those skilled in the relevant art(s) without departing the spirit and scope of the present disclosure. The event can include a musical event, a theatrical event, a sporting event, a motion picture, and/or any other suitable event that will be apparent to those skilled in the relevant art(s) without departing the spirit and scope of the present disclosure. In some embodiments, the venue 100 can represent a three-dimensional structure, for example, a hemisphere structure, also referred to as a hemispherical dome.

As illustrated in FIG. 1, the venue 100 can further include loudspeakers 102.1 through 102.*i* to playback audio, or sounds, associated with the event. In some embodiments, the loudspeakers 102.1 through 102.*i* can include a proscenium array loudspeaker system that is situated at, or near, a proscenium of the venue 100, one or more effects extensions array loudspeaker systems that are situated at, or near, the proscenium array loudspeaker system, and/or one or more environmental array loudspeaker systems that are situated throughout the venue 100. In some embodiments, the proscenium array loudspeaker system, the one or more effects extensions array loudspeaker systems, and/or the one or more environmental array loudspeaker systems can include one or more line arrays of loudspeakers that can include one or more super tweeters, one or more tweeters, one or more mid-range speakers, one or more woofers, one or more subwoofers, and/or one or more full-range speakers to provide some examples. In these embodiments, the one or more line arrays of loudspeakers can be implemented using audio beamforming technology to create acoustic waves that provide the sounds across the venue 100. Generally, the one or more line arrays can direct these acoustic waves across various three-dimensional regions within the venue 100 to provide the sounds to one or more seating sections 104. In some embodiments, the one or more seating sections 104 seat an audience at various locations within the venue 100 to experience the event.

As to be described in further detail below, the venue 100 can implement a spatial audio metering system to estimate the coverage area of the loudspeakers 102.1 through 102.*i* across the venue 100. In some embodiments, the spatial audio metering system allows for the visual estimation of the estimate the coverage area of the loudspeakers 102.1 through 102.*i*. Generally, the human eye is capable of detecting light in the visible spectrum, between approximately $4 \times 10^{14}$ Hertz (Hz) and approximately to $8 \times 10^{14}$, whereas the acoustic waves generated by the loudspeakers 102.1 through 102.*i* are in the auditory spectrum, between approximately 20 Hz to approximately 20 kHz. As such, the acoustic waves generated by the loudspeakers 102.1 through 102.*i* typically cannot be detected by the human eye. As to be described in further detail below, the venue 100 can implement the spatial audio metering system to project light in the visible spectrum that coincides with the acoustic waves generated by the loudspeakers 102.1 through 102.*i*. This allows for the visual estimation of the coverage area of the loudspeakers 102.1 through 102.*i* across the venue 100. In some embodiments, the spatial audio metering system can be used to adjust the spatial arrangement of the loudspeakers 102.1 through 102.*i* within the venue 100 to accommodate for incomplete or deficient regions, also referred to as gaps, in the coverage area of the loudspeakers 102.1 through 102.*i*. As part of this spatial audio metering system, the venue 100 can project the light that coincides with the acoustic waves generated by the loudspeakers 102.1 through 102.*i* in an extended reality (XR) environment, such as an augmented reality (AR) environment, a virtual reality (VR) environment, and/or a mixed reality (MR) environment. As part of this spatial audio metering system, the venue 100 can measure the acoustic waves generated by the loudspeakers 102.1 through 102.*i*. In some embodiments, the venue 100 can analyze these measurements to modify one or more parameters, characteristics, and/or attributes of the acoustic waves generated by the loudspeakers 102.1 through 102.*i*. In these embodiments, the spatial audio metering system can be used to modify the acoustic waves generated by the loudspeakers 102.1 through 102.*i* to provide a similar auditory experience of the event for the audience across the venue 100.

Exemplary Spatial Audio Metering System Using Mixed Reality Devices

Figure 2A:
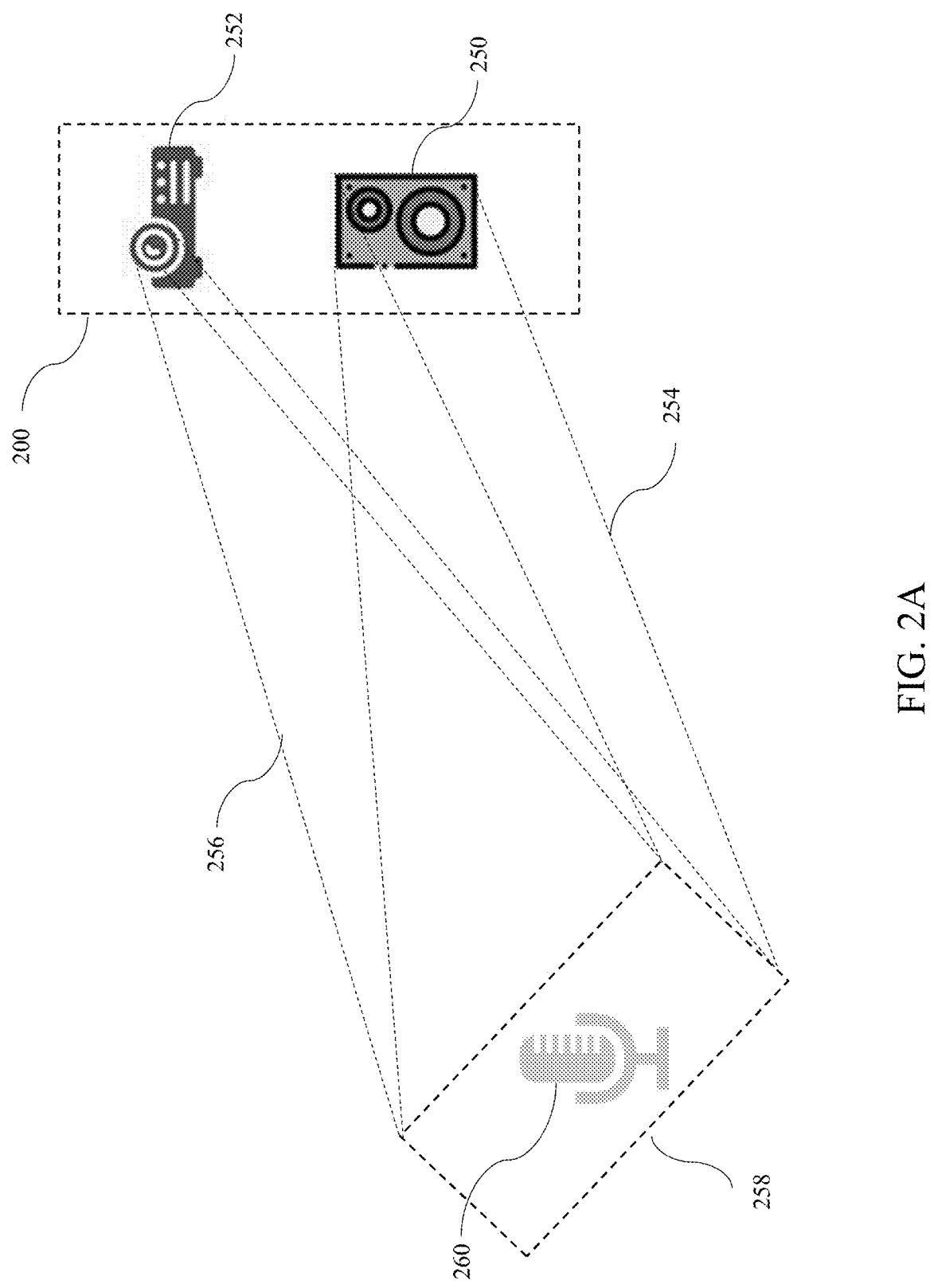
FIGS. 2A, 2B, and 3 illustrate example visualizations of a spatial audio metering system using a Mixed Reality device(s) for configuration operations according to some embodiments.

FIG. 2A illustrates a pictorial representation of an exemplary spatial audio metering system in accordance with some exemplary embodiments of the present disclosure. In some embodiments, a spatial audio metering system 200 can include a speaker 250 and a virtual speaker projector 252. In these embodiments, the spatial audio metering system 200 can map light beams 256 generated by a virtual speaker projector 252 to coincide with audio beams 254 generated by a speaker 250 onto a target area 258. As to be further described in detail below, one or more real-world users of the spatial audio metering system 200 can configure and playback audio, or sounds, associated with the event on the speaker 250. As the one or more real-world users view the light beams 256, these users can virtually interact with the spatial audio metering system 200, for example, move around the virtual event to view the light beams 256 at various locations and/or modify one or more parameters, characteristics, and/or attributes of the speaker 250.

In some embodiments, the spatial audio metering system 200 can use the virtual speaker projector 252 to provide a 3D representation of an audio transmission pattern generated by the speaker 250. As described above in FIG. 1, the audio beams 254 generated by the speaker 250 typically cannot be detected by the human eye. To provide a visual aid for audio detection, the virtual speaker projector 252 can approximate properties of the audio beam 254 (e.g. direction, size, shape, etc.) to generate the light beam 256 that visualizes those properties of audio beam 254. The virtual speaker projector 252 can then map the light beam 256 to coincide with the audio beam 254 to visually illustrate the projection of the audio beam 254 onto the target area 258, in a manner suitable for rendering on a device such as a head-mounted display. This allows for the visual estimation of the coverage area of speaker 250 within a venue.

In some embodiments, the spatial audio metering system 200 can include a microphone 260 to measure the audio beam 254 generated by the speaker 250. The microphone 260 can detect sound vibrations in the air and translate the sound vibrations into electronic signals to provide feedback information to spatial audio metering system 200. The spatial audio metering system 200 can analyze these measurements from the microphone 260 to modify one or more parameters, characteristics, and/or attributes of the audio beam 254 generated by the speaker 250.

Figure 2B:
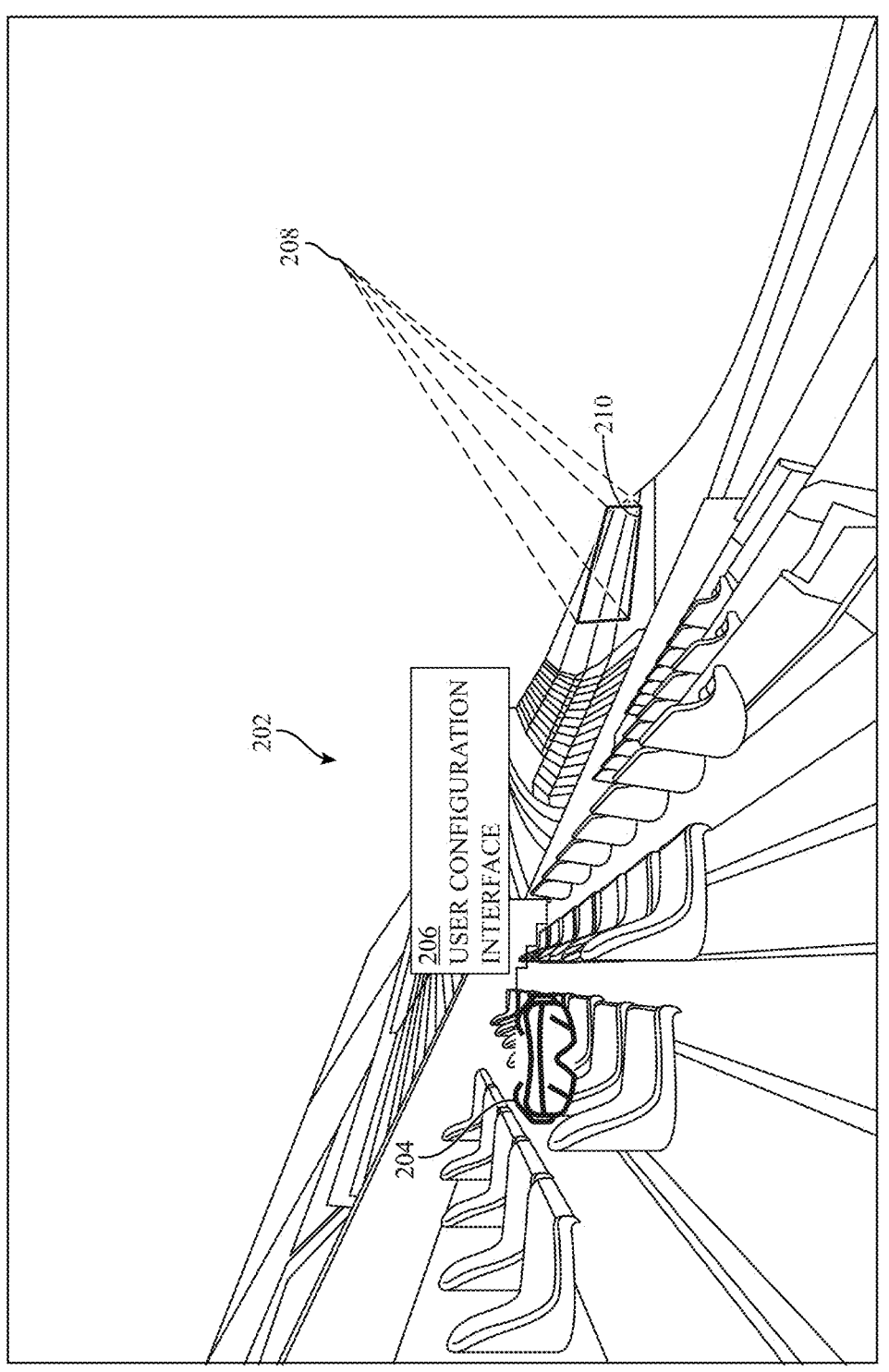

FIG. 2B illustrates a pictorial representation of an exemplary spatial audio metering system in accordance with some exemplary embodiments of the present disclosure. A spatial audio metering system 200 can map light beams 208 that coincide with audio, or sounds, associated with an event, such as a musical event, a theatrical event, a sporting event, and/or a motion picture event to provide some examples, onto target areas 210 of a venue 202 for a user to view through a user device 204. As to be further described in detail below, one or more real-world users of the spatial audio metering system 200 can configure and playback a selected sound source in an extended reality (XR) environment, such as an augmented reality (AR) environment, a virtual reality (VR) environment, and/or a mixed reality (MR) environment, either to test the selected sound source at the venue 202 or to simulate the event being presented at the venue 202 as a virtual event. As the one or more real-world users view the audio visualizations, these users can virtually interact with the audio visualizations, for example, move around the virtual event to view the audio visualizations at various locations and/or modify one or more parameters, characteristics, and/or attributes of the sound sources.

In some embodiments, the user device 204 can include one or more computing devices, such as one or more desktop computers, one or more mobile phones, one or more mobile computing devices; one or more mobile internet devices, such as tablet computers and/or laptop computers, one or more mobile video game consoles, one or more mobile wearable electronic devices, such as smartwatches, and/or any other computing device having one or more processors that will be recognized by those skilled in the relevant art(s) without departing from the spirit and scope of the present disclosure to provide some examples. In some embodiments, these one or more computing devices can be communicatively coupled to one or more virtual reality (VR) headsets and/or one or more VR controllers.

In some embodiments, the user device 204 can process a virtual event that can be viewed independently or overlaid on the view of venue 202 through user device 204. This processing can include tracking three-dimensional positions of each user in the three-dimensional space of the virtual event, estimating lines of sight of each user at the three-dimensional positions, estimating fields of view for each user that are associated with the lines of sight, and/or matching the virtual event views to the fields of view of each users at the three-dimensional positions.

In some embodiments, a real-world user of user device 204 can move through views the virtual event. In some embodiments, these interactions can include virtually moving a virtual user corresponding to the real-world user around the three-dimensional space of the virtual event to view the light beams 208 at various locations. In some embodiments, these various locations can include locations in the three-dimensional space of the virtual event that are not normally available to view the event at the venue 202, such as a broadcast film camera location to provide an example. In some embodiments, the real-world user can move through the venue 202 as the view of user device 204 updates in real time to align the virtual event overlay with the user's view of the venue 202.

In some embodiments, spatial audio metering system 200 can include light beams 208. These light beams 208 can be visual representations of real-world audio effects related to the actual event to provide a visual aid for real-world audio effects that are not ordinarily visible to the human eye. While these various real-world audio effects can be detectable by audio equipment, the exact coverage areas can be difficult to understand for selected content. In addition, if a sound coverage mapping is needed in a virtual environment, the physical measuring of sound coverage patterns would not be applicable. Therefore, the technology as disclosed herein visualizes the parameters, characteristics, and/or attributes of sound coverages with volumetric light beams within imagery of the venue 202.

In some embodiments, a virtual event can represent real-world audio properties through light beams 208, which can be visual virtual effects, such as arrows, lines, or any other visual effect that can be displayed in the virtual event. For example, a light beam 208 for directed audio (e.g., beamforming) may depict the direction of audio from a source to an intended target area 210 and the interaction of the audio with architecture of the venue. When parameters, characteristics, and/or attribute of these real-world effects are modified (e.g., by a user device 204), the light beam 208 can update to represent that modification. For example, the updated light beam 208 may represent a new direction or target for the directed audio.

In some embodiments, the light beam 208 can represent a focused beam sound source that can be configured to be heard by target area 210 of a seating section in venue 202. In some embodiments, a sound beam is generated by piezoelectric or electrostatic transducers (or arrays thereof). However, any known method of generating a sound beam for location specific audio coverage can be substituted without departing from the scope of the technology described herein. A visualization of this sound coverage pattern would provide a sound engineer, for example, a quick way to configure sound coverage for specific seating sections.

In some embodiments, the light beam 208 can represent a wide coverage beam sound source that can be configured to be heard by a target area 210 of an entire seating area in venue 202. In some embodiments, a wide sound beam can be generated by arrays of piezoelectric or electrostatic transducers. However, any known method of generating a wide sound beam for location specific audio coverage can be substituted without departing from the scope of the technology described herein. A visualization of this sound coverage pattern would provide a sound engineer, for example, a quick way to configure sound coverage for all seating sections. In some embodiments, the light beam 208 can represent a diffuse beam sound source that can be configured to be heard by target area 210 of a seating section in venue 202. Diffusion of sound can be important for avoiding dead spots, places where the sound is weak or cannot be heard clearly. Diffused beams are generated by scattering the sound by surface variations of the sound source, such as deflecting or scattering surfaces. However, any known method of generating a diffused sound beam for location specific audio coverage can be substituted without departing from the scope of the technology described herein. A visualization of this sound coverage pattern would provide a sound engineer, for example, a quick way to configure sound coverage for a focused seating section.

In some embodiments, the light beam 208 representing the sound source coverage may have any geometric shape, aperture size, volume of light, or other geometric light properties as defined by the source type and/or sound configuration shape. For example, a focused beam may start at a point and fan out in a trapezoidal shape as it extends from the point, while a diffuse beam may start as a rectangle and fan out in a trapezoidal shape. In another example, a focused beam may start at a point and fan out in a conical shape, thus creating a circular target area 210.

In some embodiments, a light beam 208 can be assigned a unique color that can symbolize certain audio properties (e.g. frequency) of the corresponding sound source. While specific color assignments and frequency ranges will be described hereafter, the ranges and color assignments may vary without departing from the scope of the technology described herein. For example, other colors, frequencies, and color intensity gradients may be chosen as desired as long as a separate color is assigned to defined audio sources, channels, ranges, etc.

In a first approach, the seven known colors of the visual spectrum are mapped to the seven known audio ranges. For example, sunlight splits into seven colors, namely Violet, Indigo, Blue, Green, Yellow, Orange, and Red (VIBGYOR). In addition, sound splits to commonly labeled ranges of sub-bass (16-60 Hz), bass (60-250 Hz), lower mid-range (250-500 Hz), mid-range (500-2K Hz), high mid-range (2-4K Hz), presence (4-6K Hz) and brilliance (6K-20K Hz). To illustrate volume intensity, the color saturation or brightness may be increased proportionally as the volume is increased. In this approach, a different color is assigned to each audio range. For example, as shown, the darkest colors are allocated to the lower frequency components and the brighter colors to the higher frequency components. These specific color and frequency range assignments are for illustration purposes and may be varied to achieve differing visualizations.

In this first approach, loudspeakers may have a dedicated purpose, such as providing bass. In this scenario, each dedicated bass sound source may be mapped visually using a common color to illustrate overall bass coverage in a venue. Alternatively, or in addition to, each sound source may generate multiple audio ranges and the visualization may include one or more audio ranges using common colors for similar ranges. For example, a venue 202 may have 20 sound sources each providing at least a first and a second audio range. Each of the first and second audio ranges can be assigned a unique color and the visualization can be generated for each audio range or for both ranges in a combined visualization. This approach may be applied to any audio range, combination of ranges, or to specific sound effects.

Alternatively, or in addition to, in a second approach, separate sound sources (e.g., loudspeaker arrays or beams) may be collectively assigned separate colors to allow for distinguishing one sound source from another when sound coverage overlap occurs in the venue. In this approach, colors are not assigned to an audio range.

Alternatively, or in addition to, the two approaches may be combined. One skilled in the art will appreciate that other approaches or combinations may be implemented using the technology as described herein without departing from the scope of the disclosure.

In the exemplary embodiment illustrated in FIG. 2, the user device 204 can configure and playback the virtual event to virtually prepare and simulate the event being presented at the venue. In some embodiments, these interactions can include virtually modifying the virtual event as the user is viewing the virtual event independently or overlaid on the venue 202. In some embodiments, these interactions can include modifying the physical audio systems for the venue 202. To input modifications in these various embodiments, a user can interact with a user configuration interface 206 to change temporal, spectral, and spatial properties of the audio systems for the virtual event and/or real-world event. In some embodiments, the user configuration interface 206 can allow the user to stop, pause, fast-forward, and/or rewind the virtual event.

In some embodiments, the user configuration interface 206 for user device 204 can provide various virtual graphical elements to the real-world users to allow these users to modify the virtual event. In these embodiments, these virtual graphical elements of user configuration interface 206 can outline various interactions, for example, modifications, that are available to the real-world users. In these embodiments, these virtual graphical elements of user configuration interface 206 can include one or more radio buttons, one or more check boxes, one or more text boxes, one or more toggle switches, one or more pop-up menus, one or more lists, and/or any other suitable mechanism that allows the real-world users to interact to provide some examples. For example, these modifications can include removing the one or more parameters, characteristics, and/or attributes of the virtual event from the three-dimensional space of the virtual event. As another example, these modifications can include moving a location, for example, a position and/or an orientation, of the one or more parameters, characteristics, and/or attributes of the virtual event within the three-dimensional space of the virtual event. As a further example, these modifications can include inserting one or more new parameters, new characteristics, and/or new attributes into the three-dimensional space of the virtual event. In some embodiments, the parameters, characteristics, and/or attributes of the virtual event can include, or relate to, the temporal, spectral, and spatial properties of the audio of the venue, the one or more computer-generated digital models of the various architectural features of the venue, the one or more computer-generated digital models of the various objects, the one or more computer-generated models of the one or more performers, the one or more computer-generated models of the one or more props that are associated with the event, and/or other suitable parameters, characteristics, and/or attributes of the virtual event that will be apparent to those skilled in the relevant art(s) without departing the spirit and scope of the present disclosure.

In some embodiments, users may modify parameters, characteristics, and/or attributes of virtual audio effects via a user configuration interface 206 provided by user device 204. For example, a user may modify a parameter, characteristic, and/or attribute of the virtual event at user device 204, such as the audio direction of a speaker. Such a modification can change virtual event to display a new representation of the revised audio direction within the venue 202. In this manner, the spatial audio metering system 200 can simulate the behavior of real-world audio effects within a particular venue and display that simulated behavior as virtual graphical elements. As described below, the spatial audio metering system 200 can perform various audio configuration tasks.

In some embodiments, the spatial audio metering system 200 can perform temporal metering for audio configuration tasks. A user of spatial audio metering system 200 can set a volume of a sound source through various input methods with user configuration interface 206. For example, a user can adjust the volume level of a sound source using voice or gesture inputs. When a user configures the temporal properties, user configuration interface 206 can display a loudness meter, decibel (dB) values, labels, and/or other indicators of temporal properties. In response to a configuration input, a user can view a light beam 208 and/or a data overlay. Therefore, spatial audio metering system 200 can reduce logistic demand and time budget by enabling a user to perform configuration tasks with in-situ loudness visualizations, thus increasing confidence in loudness across review sites.

In some embodiments, the spatial audio metering system 200 can perform spectral metering for audio configuration tasks. A user of spatial audio metering system 200 can set a frequency and a balance of selected frequencies, called equalization (EQ), of a sound source through various input methods with user configuration interface 206. For example, a user can adjust the EQ of a sound source using voice or gesture inputs. When a user configures the spectral properties, user configuration interface 206 can display a frequency meter, EQ controls, labels, and/or other indicators of spectral properties. In response to a configuration input, a user can view a light beam 208 and/or a data overlay. Therefore, spatial audio metering system 200 can reduce logistic demand and time budget by enabling a user to perform configuration tasks with in-situ spectral visualizations, thus allowing users to match spectral content to the output capability of venue speakers.

In some embodiments, the spatial audio metering system 200 can perform spatial metering for audio configuration tasks. A user of spatial audio metering system 200 can set the coverage area of a sound source through various input methods with user configuration interface 206. For example, a user can adjust a directional sound beam of a sound source using voice or gesture inputs to avoid acoustic reflection. In another example, a user can preview acoustic choreography or directional sound movement at various playback speeds. In another example, a user can overlay light beams 208 to determine studio-venue translation differences in coverage and overlap due to various speaker layouts. When a user configures the spatial properties, user configuration interface 206 can display coverage areas (e.g. incident audio beams, reflected audio beams, and/or overlapping audio beams), a frequency meter, a loudness meter, labels, and/or other spatial indicators. In response to a configuration input, a user can view a light beam 208, a timelapse of the virtual event, heatmap, and/or a data overlay. Therefore, spatial audio metering system 200 can reduce logistic demand and time budget by enabling a user to perform configuration tasks with in-situ spatial visualizations, thus providing visual aids for the purposes of authoring spatial audio content, tuning for studio-venue translation, and calibrating large venue playback systems.

Figure 3:
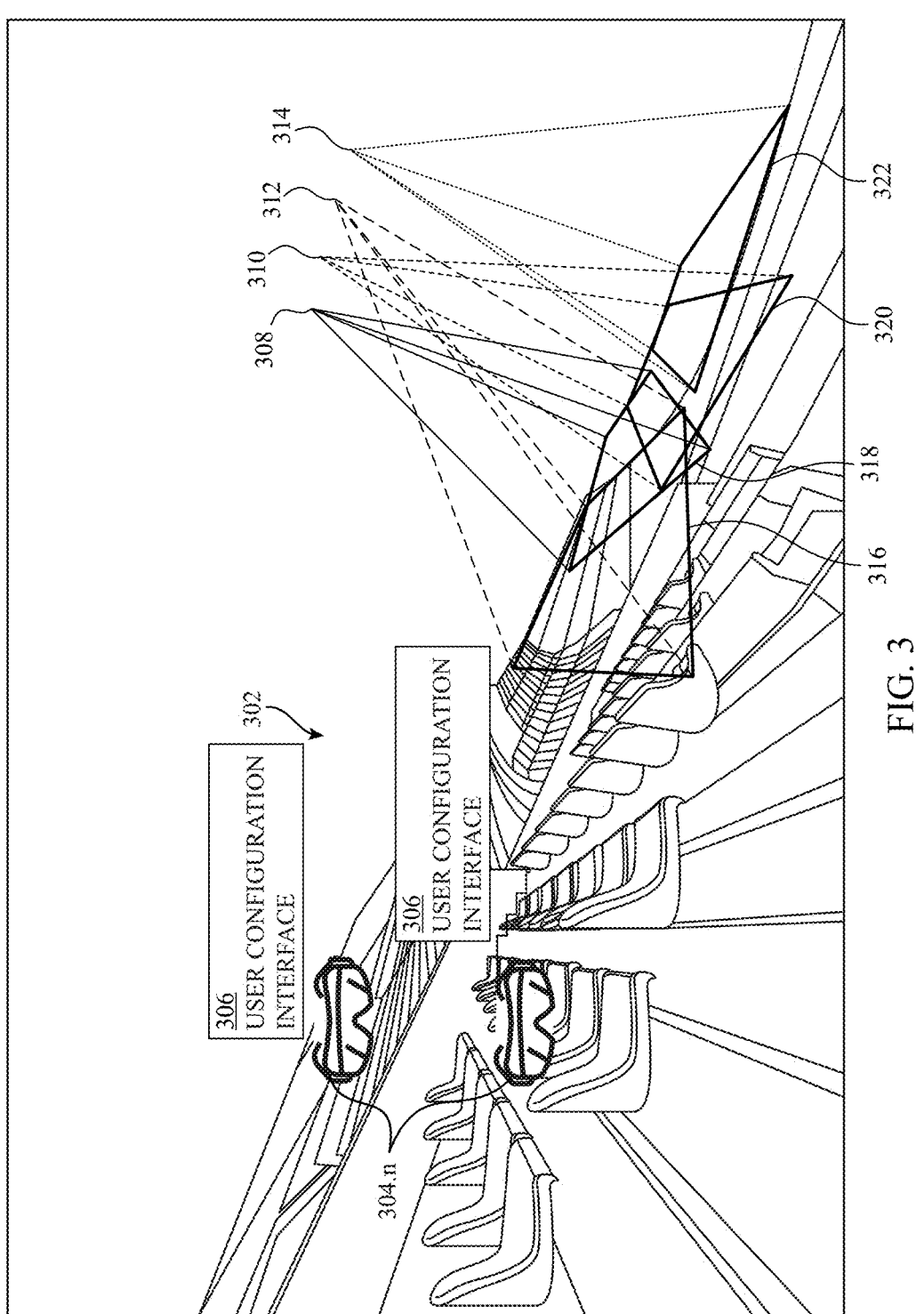

FIG. 3 illustrates a pictorial representation of an exemplary spatial audio metering system using multiple MR devices in accordance with some exemplary embodiments of the present disclosure. In this exemplary embodiment, spatial audio metering system 300 can allow multiple real-world users to view and configure the virtual event from their respective user devices 304.1 through 304.*n* from the same location or at different locations in the three-dimensional space of venue 302 through an extended reality (XR) environment, such as an augmented reality (AR) environment, a virtual reality (VR) environment, and/or a mixed reality (MR) environment. The above discussion of spatial audio metering system 200 can apply to spatial audio metering system 300. Spatial audio metering system 300 can perform the various audio configuration tasks disclosed above in regard to FIG. 2.

In some embodiments, spatial audio metering system 300 can provide visual representations of sound coverage from multiple sound sources in a venue 302. As shown in FIG. 3, a first light beam 308, a second light beam 310, a third light beam 312, and a fourth light beam 314 can be configured to be heard by selected target areas 318, 320, 316, and 322, respectively, of venue 302. In this approach, one or more of the respective various sound coverages can overlap. In this scenario, a visualization of the sound sources would lead to an understanding of where coverage exists or where gaps can exist. Adjusting sound source configurations, such as, but not limited to, type, directivity, size, shape, power, position, or spectral properties can be necessary to fill any gaps or to eliminate unnecessary overlaps. Any known sound source can be substituted without departing from the scope of the technology described herein.

In some embodiments, spatial audio metering system 300 can perform multi-zone content configuration using multiple user devices 304.1 through 304.*n*. By interacting with user configuration interface 306, users can playback and review light beams 308 through 314 at multiple target areas 316 through 322 concurrently using multiple user devices. In some embodiments, users can monitor crosstalk or signal bleeding between adjacent target areas 316 through 322. For example, one user can listen to audio content, monitor sound pressure level (SPL) and signal leak, and annotate audio quality at multiple target areas 316 through 322 at the same time. When a user configures the multi-zone content properties, user configuration interface 306 can display coverage areas, a frequency meter, a loudness meter, labels, and/or other audio property indicators. In response to a configuration input, a user can view a light beam 308 through 314 and/or a data overlay. Therefore, spatial audio metering system 300 can reduce logistic demand and time budget by enabling more than one user to perform the configuration tasks concurrently with in-situ visualizations and annotation interactivity.

In some embodiments, the spatial audio metering system 300 can propagate these interactions and modifications across multiple real-world users of the spatial audio metering system 300 to allow these real-world users to collaboratively interact with the virtual event. A user at user device 304.1 may wish to collaborate with another user at user device 304.2 on the interaction with a light beam 308 through 314. User device 304.1 may initiate a communication with the user device 304.2 which may include modifying the virtual event. For example, user device 304.1 may send an instruction to user device 304.2 to change the direction of light beam 308. As another example, user device 304.1 may transmit a text-based communication that includes an image of the interaction with a light beam 308 through 314 to the user device 304.2. When applying configuration modifications, a user device 304.1 can transmit a configuration modification to the user devices 304.2 to 304.*n*. Upon receiving the modification, user devices 304.2 to 304.*n* can update respective views of the virtual event based on the modification. This update includes displaying the light beam 308 through 314 representing the new audio direction in respective virtual event views for each user device 304.*n*.

Figure 4:
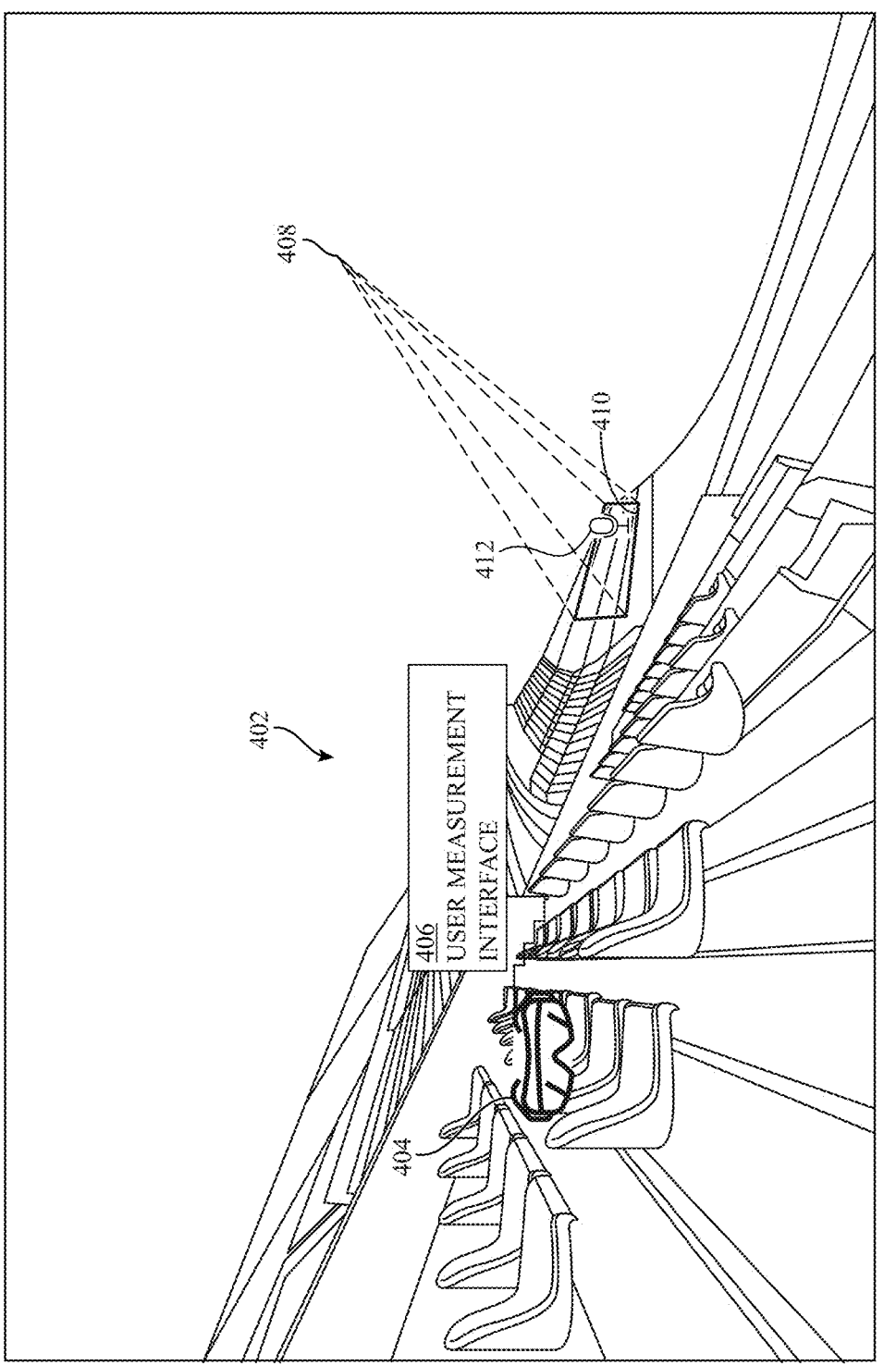
FIGS. 4-5 illustrate example visualizations of a spatial audio metering system using a Mixed Reality device(s) for measurement operations according to some embodiments.

FIG. 4 illustrates a pictorial representation of an exemplary spatial audio metering system using a MR device in accordance with some exemplary embodiments of the present disclosure. In this exemplary embodiment, spatial audio metering system 400 can allow one or more real-world users to view and measure the virtual event from their respective user devices 404.1 through 404.*n* from the same location or at different locations in the three-dimensional space of venue 402 through an extended reality (XR) environment, such as an augmented reality (AR) environment, a virtual reality (VR) environment, and/or a mixed reality (MR) environment. The above discussion of spatial audio metering system 200 can apply to spatial audio metering system 400.

In some embodiments, spatial audio metering system 400 can include one or more microphones 412. Microphone 412 can detect sound vibrations in the air and translate the sound vibrations into electronic signals in order to provide feedback information to spatial audio metering system 400. In some embodiments, microphone 412 can be stationary. For example, microphone 412 can be affixed to a seating section within a target area 410. In some embodiments, microphone 412 can be portable. For example, microphone 412 can be affixed to an unmanned aerial vehicle (UAV) or user device 404 so that microphone 412 can be moved throughout venue 402.

In some embodiments, a user measurement interface 406 for user device 404 can provide various virtual graphical elements to the real-world users to allow these users to modify the virtual event. User device 404 can receive feedback information from microphone 412 and can pass this feedback information to user measurement interface 406 to generate a virtual graphical elements for the user. These virtual graphic elements of user measurement interface 406 can outline various types of feedback information, for example, volume, frequency, and coverage of detected audio within venue 402. As described in the discussion of FIG. 2, user measurement interface 406 can allow a user to modify audio properties.

In some embodiments, spatial audio metering system 400 can perform quality control operations by way of through measurement tasks for audio systems at venue 402. A user can view an identification tag for each speaker and can annotate the status of a speaker by using a gesture or voice input. For example, a user can play a test tone, listen to live output, and annotate results of the speaker with user device 404. Through annotations, a user can indicate functional speakers and malfunctioning speakers within venue 402. This feature of spatial audio metering system 400 can be useful in large venues where it is difficult to locate a sound origin only through listening and it is not efficient for an operator to walk to each speaker for individual inspection. As a result, spatial audio metering system 400 can reduce logistic demand and time budget by enabling a user to perform quality control tasks, such as measurements, inspection, and annotations, by way of in-situ visualizations.

In some embodiments, the spatial audio metering system 400 can perform temporal metering for audio measurement tasks. A user of spatial audio metering system 400 can compute loudness using input from microphone 412, which can act as an SPL meter. For example, this user can compare digital gain level in the user measurement interface 406 against SPL measured using microphone 412. In response to the measurement information, a user can adjust a volume of a sound source through various input methods with user measurement interface 406. For example, a user can adjust the volume level of a sound source using voice or gesture inputs. When a user measures the temporal properties, user measurement interface 406 can display a loudness meter, decibel (dB) values, labels, and/or other indicators of temporal properties. In response to a measurement input, a user can view a light beam 408 and/or a data overlay. Therefore, spatial audio metering system 400 can reduce logistic demand and time budget by enabling a user to perform measurement tasks with in-situ loudness visualizations based on input from microphone 412, thus increasing confidence in loudness across review sites.

In some embodiments, the spatial audio metering system 400 can perform spectral metering for audio measurement tasks. A user of spatial audio metering system 400 can compute spectrum frequencies using input from microphone 412, which can act as a spectrum analyzer. For example, this user can compare computed spectrum frequencies in the user measurement interface 406 against frequency response measured using microphone 412. In response to the measurement information, a user of spatial audio metering system 200 can adjust a frequency and a balance of selected frequencies, called equalization (EQ), of a sound source through various input methods with user measurement interface 406. For example, a user can adjust the EQ of a sound source using voice or gesture inputs. When a user measures the spectral properties, user measurement interface 406 can display a frequency meter, EQ controls, labels, and/or other indicators of spectral properties. In response to a measurement input, a user can view a light beam 408 and/or a data overlay. Therefore, spatial audio metering system 400 can reduce logistic demand and time budget by enabling a user to perform measurement tasks with in-situ spectral visualizations based on input from microphone 412, thus allowing users to match spectral content to the output capability of venue speakers.

In some embodiments, the spatial audio metering system 400 can perform spatial metering for audio measurement tasks. A user of spatial audio metering system 400 can compute coverage, loudness, or spectrum frequencies using input from microphone 412. For example, this user can compare computed spectrum frequencies against frequency response measured by microphone 412 at various seating sections to determine the coverage areas of a certain frequency. A heatmap visualization can provide an overview of such inspection results. In response to the measurement information, a user of spatial audio metering system 400 can adjust the coverage area of a sound source through various input methods with user measurement interface 406. For example, a user can adjust a directional sound beam of a sound source using voice or gesture inputs to avoid acoustic reflection. In another example, a user can preview acoustic choreography or directional sound movement at various playback speeds. In another example, a user can overlay light beams 408 to determine studio-venue translation differences in coverage and overlap due to various speaker layouts. When a user measures the spatial properties, user measurement interface 406 can display coverage areas (e.g.

incident audio beams, reflected audio beams, and/or overlapping audio beams), a frequency meter, a loudness meter, labels, and/or other spatial indicators. In response to a measurement input, a user can view a light beam 408, a timelapse of the virtual event, heatmap, and/or a data overlay. Therefore, spatial audio metering system 400 can reduce logistic demand and time budget by enabling a user to perform measurement tasks with in-situ spatial visualizations based on input from microphone 412, thus providing visual aids for the purposes of authoring spatial audio content, tuning for studio-venue translation, and calibrating large venue playback systems.

Figure 5:
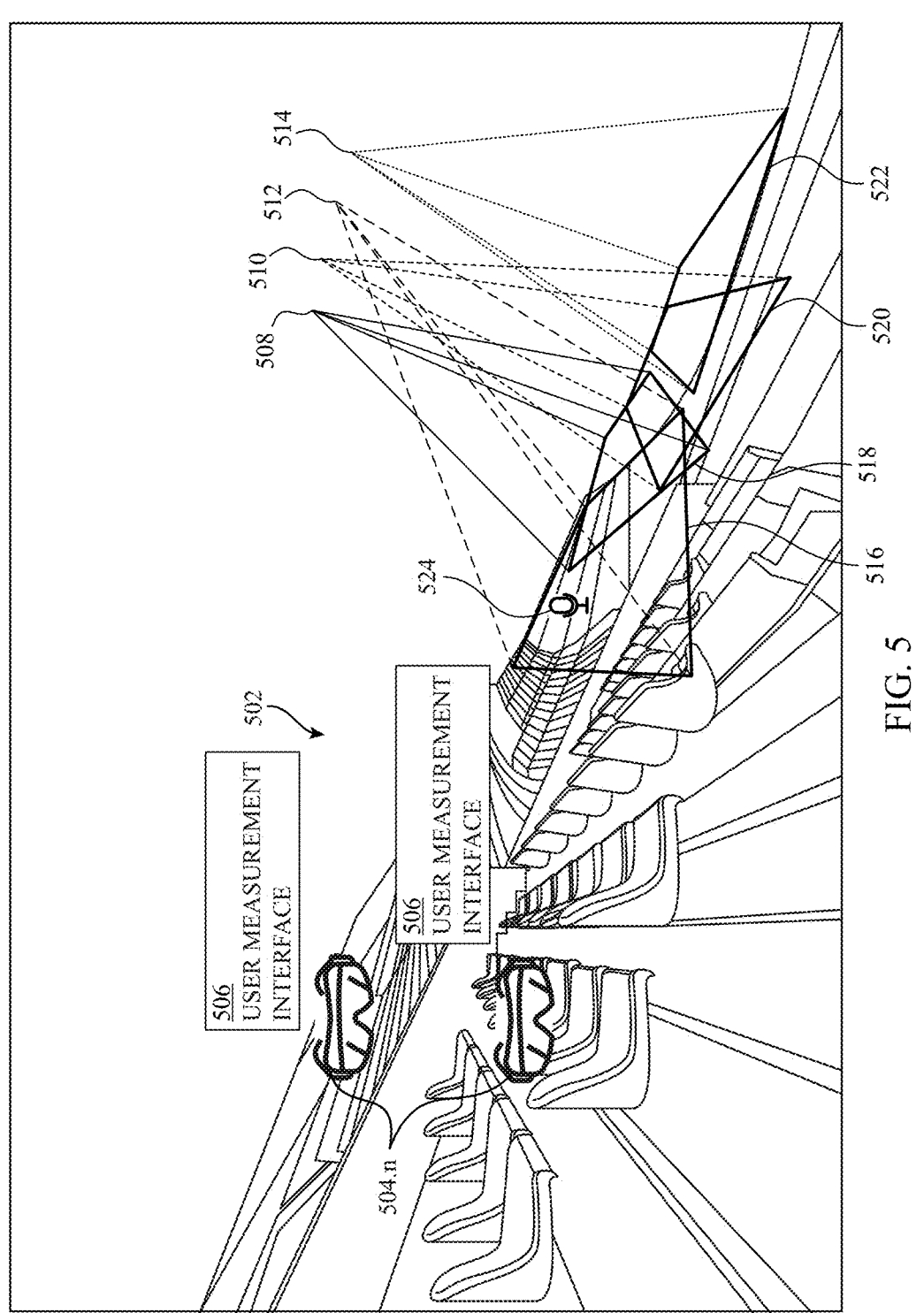

FIG. 5 illustrates a pictorial representation of an exemplary spatial audio metering system using multiple MR devices in accordance with some exemplary embodiments of the present disclosure. In this exemplary embodiment, spatial audio metering system 500 can allow multiple real-world users to view and measure the virtual event from their respective user devices 504.1 through 504.$n$ from the same location or at different locations in the three-dimensional space of venue 502 through an extended reality (XR) environment, such as an augmented reality (AR) environment, a virtual reality (VR) environment, and/or a mixed reality (MR) environment. To enhance measurement precision, multiple reference microphone 524 can be used with user devices 504.1 through 504.$n$. The above discussion of spatial audio metering system 400 can apply to spatial audio metering system 500. Spatial audio metering system 500 can perform the various audio measurement tasks disclosed above in regard to FIG. 4.

In some embodiments, spatial audio metering system 500 can provide visual representations of sound coverage from multiple sound sources in a venue 502. As shown in FIG. 5, a first light beam 508, a second light beam 510, a third light beam 512, and a fourth light beam 514 can be configured to be heard by selected target areas 518, 520, 516, and 522, respectively, of venue 502. In this approach, one or more of the respective various sound coverages can overlap. In this scenario, a visualization of the sound sources would lead to an understanding of where coverage exists or where gaps can exist. Measuring sound sources and accordingly adjusting the sound source configurations, such as, but not limited to, type, directivity, size, shape, power, position, or spectral properties can be necessary to fill any gaps or to eliminate unnecessary overlaps. Any known sound source can be substituted without departing from the scope of the technology described herein.

In some embodiments, spatial audio metering system 500 can perform multi-zone content measurement using multiple user devices 504.1 through 504.$n$. By interacting with user measurement interface 506, users can playback and review light beams 508 through 514, based on input from a microphone 524, at multiple target areas 516 through 522 concurrently using multiple user devices. In some embodiments, users can monitor crosstalk or signal bleeding between adjacent target areas 516 through 522 by using microphone 524 to detect live playback. For example, one user can listen to audio content, monitor sound pressure level (SPL) and signal leak, and annotate audio quality at multiple target areas 516 through 522 at the same time. When a user measures the multi-zone content properties, user measurement interface 506 can display coverage areas, a frequency meter, a loudness meter, labels, and/or other audio property indicators. In response to a measurement input, a user can view a light beam 508 through 514 and/or a data overlay based on input from microphone 524. Therefore, spatial audio metering system 500 can reduce logistic demand and time budget by enabling more than one user to perform the measurement tasks concurrently with in-situ visualizations based on input from microphone 524 and annotation inter-activity.

In some embodiments, the spatial audio metering system 500 can propagate these interactions and modifications across multiple real-world users of the spatial audio meter-ing system 500 to allow these real-world users to collab-oratively interact with the virtual event. A user at user device 504.1 may wish to collaborate with another user at user device 504.2 on the interaction with a light beam 508 through 514. User device 504.1 may initiate a communica-tion with the user device 504.2 which may include modify-ing the virtual event. For example, user device 504.1 may send an instruction to user device 504.2 to change the direction of light beam 508. As another example, user device 504.1 may transmit a text-based communication that includes an image of the interaction with a light beam 508 through 514 to the user device 504.2. When applying measurement modifications, a user device 504.1 can trans-mit a measurement modification to the user devices 504.2 to 504.n. Upon receiving the modification, user devices 504.2 to 504.n can update respective views of the virtual event based on the modification. This update includes displaying the light beam 508 through 514 representing the new audio direction in respective virtual event views for each user device 504.n.

Exemplary Spatial Audio Metering Mixed Reality User Device

Figure 6:
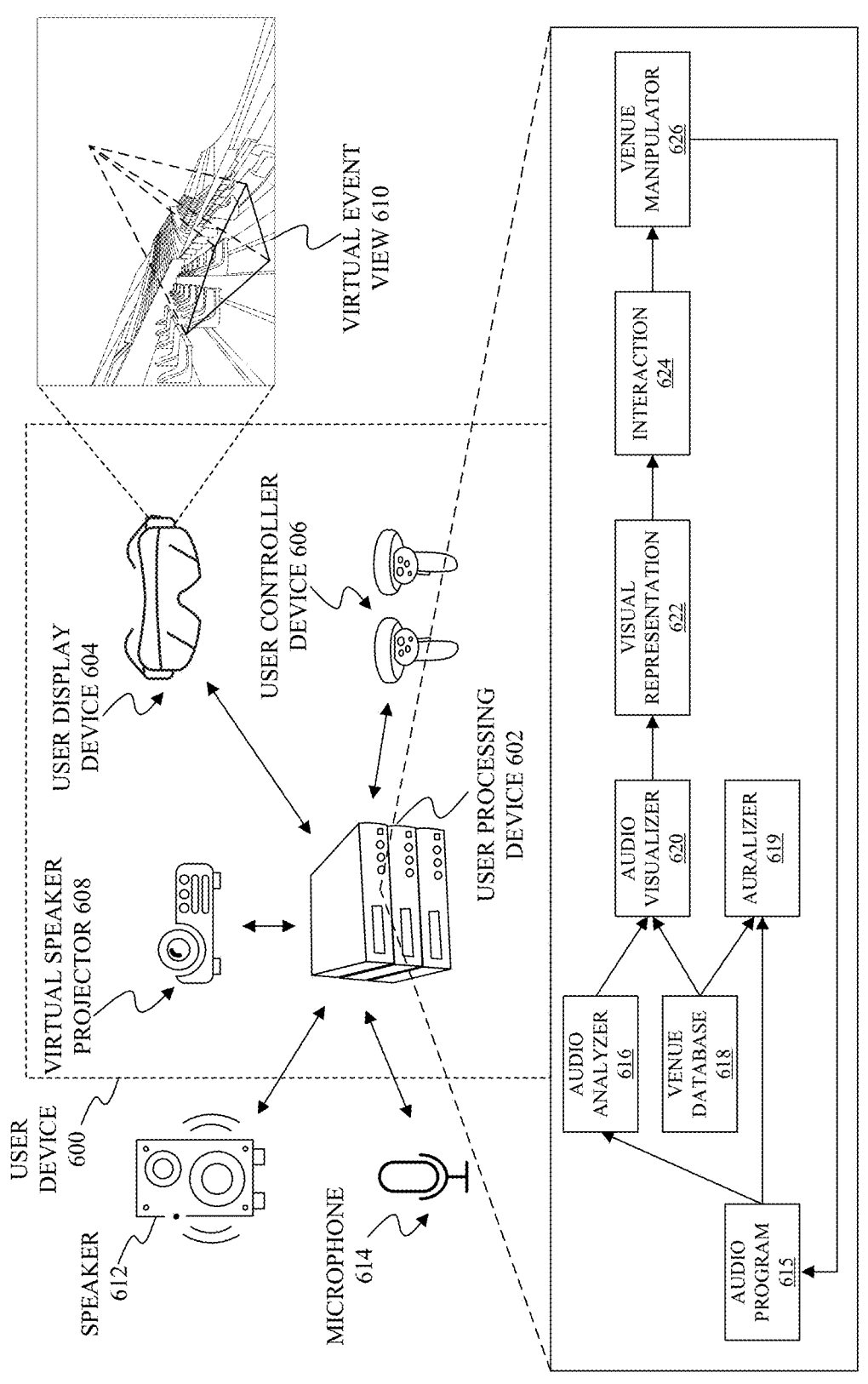
FIG. 6 illustrates an exemplary Mixed Reality user device according to some embodiments.

FIG. 6 illustrates an exemplary user device that can be implemented within the exemplary spatial audio metering system in accordance with some exemplary embodiments of the present disclosure. In the exemplary embodiment illus-trated in FIG. 6, a user device 600 can process and analyze one or more audio sources to generate a visual representa-tion of sound coverage that is mapped onto a virtual model of a venue to simulate the event being presented at a venue. As a real-world user of the user device 600 is viewing this virtual event on the user device 600, the real-world user can use the user device 600 to virtually interact with the virtual event, for example, move around the virtual event to view the virtual event at various locations and/or modify param-eters, characteristics, and/or attributes of the virtual event.

In some embodiments, the user device 600 can be imple-mented as a standalone, or a discrete device, and/or can be incorporated within or coupled to one or more computing devices, such as one or more desktop computers, one or more mobile phones, one or more mobile computing devices, one or more headsets designed for Virtual Reality (VR), Augmented Reality (AR), and/or Mixed Reality (MR), one or more mobile internet devices, such as tablet computers and/or laptop computers, one or more mobile video game consoles, one or more mobile wearable elec-tronic devices, such as smartwatches, and/or any other computing device having one or more processors that will be recognized by those skilled in the relevant art(s) without departing from the spirit and scope of the present disclosure to provide some examples. In some embodiments, the user device 600 can represent an exemplary embodiment of one or more of the user devices as described above in FIGS. 2 to 5. As illustrated in FIG. 6, the user device 600 can include a user processing device 602, a user display device 604, a user controller device 606, and a virtual speaker projector 608.

In some embodiments, the user processing device 602 can process the virtual event to generate a virtual event view 610 that corresponds to a location of a virtual user that is associated with the real-world user within the virtual event. In some embodiments, the user processing device 602 can process the virtual event to generate the virtual event view 610 for presentation in a virtual reality (VR) environment. In these embodiments, the virtual event view 610 displayed by user device 600 represents an immersive virtual world. This virtual world effectively immerses the real-world user within the virtual event giving the impression to the real-world user that they have entered the virtual event. In some embodi-ments, as the real-world user moves, such as changing location within the virtual event and/or moves a part of his or her body within the real-world, for example, moves his or her head up-and-down or side-to-side, the user device 600 may update virtual event view 610 to effectively immerse the real-world user within the virtual event. In some embodi-ments, the user processing device 602 can process the virtual event to generate the virtual event view in a substantially similar manner as described above in FIGS. 2 to 5. In these embodiments, this processing can include tracking a three-dimensional position of the virtual user in the three-dimen-sional space of the virtual event, estimating a line of sight of the virtual user at the three-dimensional position, estimating a field of view of the virtual user that is associated with the line of sight, and/or matching the virtual event view 610 to the field of view of the virtual user at the three-dimensional position. As illustrated in FIG. 6, the user processing device 602 can include an audio program 615, an audio analyzer 616, a venue database 618, an auralizer 619, an audio visualizer 620, a visual representation 622, an interaction module 624, and a venue manipulator 626.

In some embodiments, the user display device 604 can enable the user to view the virtual event generated by the user processing device 602. The user display device 604 can include the display of a standalone, or a discrete device, and/or a device incorporated within or coupled to one or more computing devices, such as one or more desktop computers, one or more mobile phones, one or more mobile computing devices, one or more headsets designed for Virtual Reality (VR), Augmented Reality (AR), and/or Mixed Reality (MR), one or more mobile internet devices, such as tablet computers and/or laptop computers, one or more mobile video game consoles, one or more mobile wearable electronic devices, such as smartwatches, and/or any other computing device. For example, the user display device 604 can provide a MR experience that combines elements of both Augmented Reality (AR) and Virtual Reality (VR), where real-world and digital objects interact.

In some embodiments, the user display device 604 can enable the user to visually meter spatial characteristics of an acoustic output from one or more speakers 612 on-site with a MR-enabled headset. A virtual event view 610 appears on the user display device 604 so that the user can see a visual overlay of sound propagation that is virtually visualized as light propagation onto physical objects, such as a seating area. Specifically, visualizations of acoustic path, volume, coverage, and overlap in MR provide helpful visual aids for audio system calibration and acoustic choreography pre-views. A user display device 604 can include one or more cameras to visually identify seating areas, loudspeaker pan-els, venue geometry, thus enabling the user processing device 602 to map a virtual loudspeaker layout to a physical venue. In a similar manner, a user display device can include one or more microphones 614 to identify acoustic perfor-mance of speakers 612 in a venue. To enhance acoustic metering performance and precision, additional reference microphones 614 can be placed throughout the venue to capture real-time audio from speakers 612.

In some embodiments, the user controller device 606 represents an input device that is used by the real-world user to interact with the virtual event when using user device 600. In some embodiments, the user controller device 606 can include one or more action buttons and/or one or more omnidirectional control sticks or buttons that can be manipulated by the real-world user to interact with the virtual event. In some embodiments, the real-world user can use the one or more action buttons and/or the one or more omnidirectional control sticks or buttons to perform various actions within the virtual world. For example, the real-world user can use the one or more action buttons and/or the one or more omnidirectional control sticks to "point-and-click" and/or "drag and drop" one or more computer-generated digital models of various architectural features of the venue in the three-dimensional space, such as the performance area, the media surfaces, the seating locations, and/or the standing locations to provide some examples, and/or one or more computer-generated digital models of various objects at the venue in the three-dimensional space, such as stage objects that are associated with the venue and/or stage objects that are associated with the event to provide some examples.

In some embodiments, each user device 600 may be configured to generate and display a virtual event view 610 that represents a perspective of the virtual event based on the virtual location of the virtual user associated with user device 600. The virtual speaker projector 608 can provide 3D representations of an audio transmission pattern generated by audio sources, such as output from speaker 612 detected by microphone 614, suitable for rendering within virtual event view 610 on a user device 600. User device 600 can process the virtual event by representing interactions with the virtual event view 610, for example, move around the virtual event to view the virtual event at various locations and/or modify parameters, characteristics, and/or attributes of the virtual event. The visualizations from virtual speaker projector 608 enable the user to observe the outcome of their interactions with the virtual event. Different interactions may be available via a graphical user interface in the virtual event view 610 of the virtual event based on the type of user device. For example, user device 600 may include physical interface devices such as a keyboard and mouse. Virtual event view 610 may be customized to include interactions that are more easily input via such physical interface devices. Examples of such interactions for user device 600 include modifying code segments of the virtual event or any modification of parameters, characteristics, and/or attributes that requires text entry. As another example, virtual event view 610 may be customized to accommodate the VR implementation of user device 600 to include interactions that are specific to user controller device 606 or hands-free gestures. As another example, virtual event view 610 may be customized to accommodate the mobility of user device 600. Examples of such interactions for user device 600 include providing augmented reality (AR) based interactions. For example, user device 600 may be physically located within a venue in which an event is to take place while another user device 600 may be physically located remotely from the venue. Virtual event view 610 may combine a real-time view of the venue along with the virtual event in an augmented reality format. For example, virtual graphical elements of virtual event view 610 may be displayed as an overlay over real-world elements of the venue.

In some embodiments, audio program 615 can include audio objects and their metadata, which relate to audio sources of an event. An audio object can be sounds from various audio sources stored as an audio file for output in certain channels, along with corresponding spatial metadata that defines position, levels, and movement. Audio sources can be a library of audio content, an external device with stored audio content, a streaming source, or a software package which produces the audio signals to be analyzed and visualized. Common examples are Digital Audio Workstation ("DAW") software packages and audio playback servers. In some embodiments, the audio source of specific audio content can be employed to generate a variety of different visual mappings for a venue, as determined by the spatial metadata. In some embodiments, a mapping of specific audio content, for example, to be part of a live presentation at the venue, can be tested or previewed to determine sound coverages for the various seating sections of the venue throughout the live presentation. To begin the mapping process, audio program 615 sends audio object data to the audio analyzer 616 for processing.

In some embodiments, audio analyzer 616 receives desired audio content from an audio source, as defined by the audio program 615. Audio analyzer 616 can analyze the audio content for its audio signal properties, such as, but not limited to frequency, wavelength, period, and amplitude (volume), pitch, or modulation. Alternatively, or in addition to, a generic speaker array visual mapping can be implemented using generic test audio content to assess a generalized speaker array sound distribution within a venue. For example, audio signals may be configured as an audio source set of mono audio signals formatted for the specific audio system being visualized.

In some embodiments, a venue database 618 of loudspeaker and sound beam locations (i.e., audio system configuration), per input channel, for a venue provides a mapping of a specific venue's speaker/beam locations and parameters. Parameters can include, but are not limited to, positions and orientations of loudspeakers, number of speakers, arrangement (e.g., array), power, sound distribution type (e.g., diffused, directional, etc.), distortion, etc. In one non-limiting example, an audio system configuration for the venue can reflect one or more sets of loudspeakers and beams arranged in one or more arrays of varying numbers, sizes, types and power outputs. In some embodiments, an audio system configuration is a package of fixed data specifying the geometric properties of the speaker systems being metered. In a non-limiting example, the geometric properties can be the locations and orientations of the individual speakers or beams comprising the system, and their capabilities and coverage patterns. This information can be used to initially create the audio signals within the audio source and to map the resulting signals into three dimensions at the visualization stage. Additionally, venue database 618 can send data specifying the geometric properties of the speaker systems to an auralizer 619 to simulate speaker 612 output on headphones of a user device 600.

In some embodiments, an auralizer 619 can render binaural output for headphone monitoring, thereby allowing a real-world user of user device 600 to compare digital audio output with venue acoustic output in situ. Auralizer 619 can render binaural output using information from audio program 615, venue database 618, and head tracking sensors on user device 600 when necessary. By engaging with a user's sense of hearing, this simulation of audio output can permit a user of user device 600 to test and verify the results of their interactions with an audio system.

In some embodiments, audio visualizer 620 can implement a volumetric light renderer to render (i.e., draw) a light beam which represents the audio signal. The audio visualizer

620 can render beams based on various attributes, such as, location, color, orientation, type, shape, intensity or range, to name a few. The shape and location of the light beam is specified by the audio system configuration. The color and intensity of the light beam is a direct representation of the incoming audio signal properties for the sound source. The type of light beam can be based on the type of sound source. In a non-limiting example, the type of sound source may include types of loudspeakers (e.g., omnidirectional, directional, etc.), beams, sizes, array shapes, power considerations, etc. One or more microphones 614 placed throughout the venue or affixed to user device 600 can detect the signals produced by the audio source. Audio visualizer 620 can receive information from the audio analyzer 616 to read the audio signals in real-time and emit simplified signals that can be used to drive metering visualizations, such as an instantaneous level of the overall signal and its frequency components. In various embodiments, the audio source may either be the actual audio system being metered, or an acoustic model (e.g., simulation) of this system, such as a binaural renderer.

In some embodiments, audio visualizer 620 is configured as a three-dimensional (3D) visualization renderer that synthesizes a 3D representation of the audio system and its metered data. The visual representation 622 is a combination of a static scene (e.g., venue seating) and a light-based beam overlay of sound coverage from one or more sound sources within a venue as shown in FIGS. 2 to 5. In some embodiments, to render a static scene for the visual representation 622, the audio visualizer 620 uses the audio system configuration to look up the source location and direction of each incoming audio signal and renders a set of visual markers at the spatial origin of each. Audio visualizer 620 then uses the audio signal properties for each sound to determine specific light visualizations, such as color and shape of the light beam. Audio visualizer 620 can also render other static scene reference points, such as the venue walls, seating, and a proscenium opening (i.e., part of a theater stage in front of the curtain).

In some embodiments, audio visualizer 620 can orient the virtual 3D scene around a user by matching the 3D scene to motion-tracking sensors on user device 600. These motion-tracking sensors ca include an accelerometer, magnetometer, and gyroscope. Additionally, audio visualizer 620 can help the user navigate the virtual 3D scene by using 6 degrees of freedom ("DoF") sensing capabilities on the user device 600. Additional global and indoor positioning systems, such as Bluetooth or ultra-wideband ("UWB") beacons, can be used to enhance positioning performance.

In some embodiments, visual representation 622 may be implemented as a 2D or 3D visualization. The visual representation 622 can include a light beam visualization of acoustic path and coverage from sound sources (e.g., speakers or beams). The visual representation 622 can include other visualizations techniques like data overlay, heatmap, and timelapse. The visual representation 622 can also include a user interface (e.g., coverage area, metering bar, computed digital output values, measured SPL values, loudspeaker ID tag, seat section ID tag, etc.) Alternatively, or in addition to, the visual representation 622 can add imagery of the venue or at least portions of the venue as an output. The visual representation 622 may be displayed using any known display technology, such as display monitors, mobile computing devices with displays, wearable technology (e.g., glasses) or Augmented Reality (AR), Virtual Reality (VR) or Mixed Reality (MR) headsets.

In some embodiments, the interaction module 624 can provide an interactive environment for interacting with the virtual event. The interaction module 624 can allow users to move around the virtual event to view the audio visualizations at various locations and/or modify one or more parameters, characteristics, and/or attributes of the sound sources, as described above in FIGS. 2 to 5. The interaction module 624 can also provide the user device 600 with various communication capabilities, for example, audio, video, and/or data communications. In these embodiments, the interaction module 624 can request one or more communication sessions, for example, audio, video, and/or data communication sessions, to be established between other user devices within a spatial audio metering system to allow real-world users of these user devices to communicate among themselves while interacting with the virtual event in a substantially similar manner as described above in FIGS. 2 to 5.

In some embodiments, the venue manipulator 626 can receive interactions of the real-world user with the virtual event and apply user modifications to the audio system. The venue manipulator 626 can insert, for example, overlay, various virtual graphical elements onto the virtual event view to allow the real-world user to interact with the virtual event. In some embodiments, these virtual graphical elements can outline various interactions, for example, modifications, that are available to the real-world user. In these embodiments, these virtual graphical elements can include one or more radio buttons, one or more check boxes, one or more text boxes, one or more toggle switches, one or more pop-up menus, one or more lists, and/or any other suitable mechanism that allows the real-world user to interact to provide some examples. In some embodiments, the venue manipulator can recognize speech from the user of user device 600 to add annotations to the virtual event view. In some embodiments, the venue manipulator 626 can insert, for example, overlay, a virtual selection tool such as those described above in FIGS. 2 to 5 to provide an example, onto the virtual event view to allow the real-world user to interact with the virtual event. In some embodiments, the interaction module 624 can control the operations of the virtual graphical elements and/or the virtual selection tool. In these embodiments, the interaction module 624 can receive various commands, such as "pointing-and-clicking" and/or "dragging and dropping" to provide some examples. These commands can be input by user controller device 606 and/or gesture inputs. The venue manipulator 626 can then apply these various interactions to modify the audio properties of the virtual event and/or audio systems at the venue by sending the modification data to audio program 615.

Exemplary Operation of the Exemplary Spatial Audio Metering System

Figure 7:
FIG. 7 illustrates a flowchart of an example method for operating a spatial audio metering system using Extended Reality devices according to some embodiments.
Figure 7:
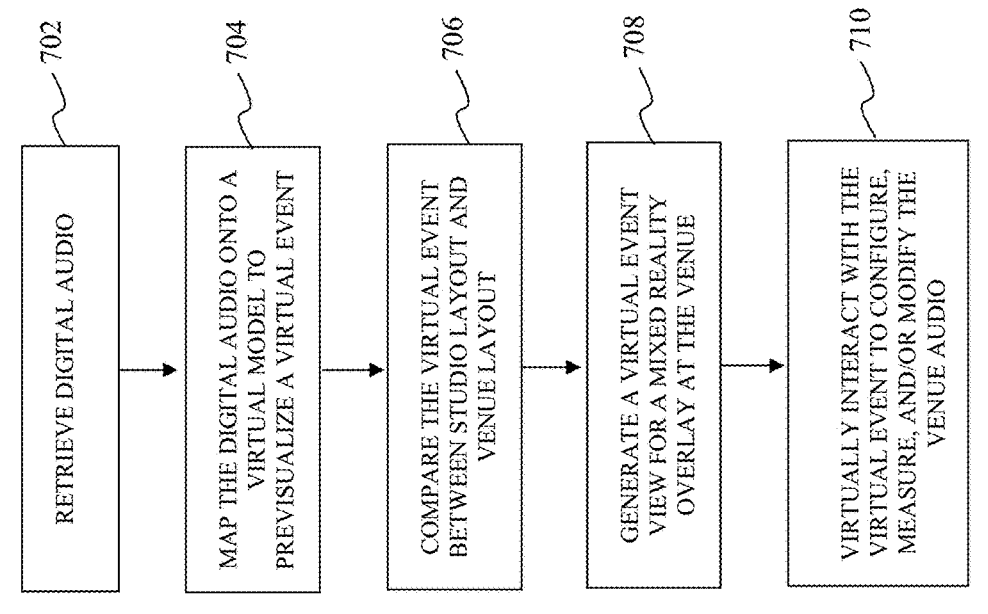

FIG. 7 illustrates a flowchart of an exemplary method of operation for a spatial audio metering system according to some exemplary embodiments of the present disclosure. The disclosure is not limited to this operational description. Rather, it will be apparent to ordinary persons skilled in the relevant art(s) that other operational control flows are within the scope and spirit of the present disclosure. The following discussion describes an exemplary operational control flow 700 that uses XR devices to configure digital audio for venue acoustics and measure audio performance at a venue. Operational control flow 700 allows real-world users to interact with a digital representation of an event mapped onto a virtual model of a venue and apply the modifications to the venue. The operational control flow 700 as to be described in further detail below can be executed by one or more computer systems, such as the user devices 204 and 304.*n* as described above in FIGS. 2 and 3, the user devices 404 and 504.*n* as described above in FIGS. 4 and 5, and/or the user device 600 as described above in FIG. 6.

At operation 702, the operational control flow 700 retrieves digital audio content from an audio source such as local computer storage, an external device, streaming source, or a software package which produces the audio signals to meter. Common examples are Digital Audio Workstation ("DAW") software packages and audio playback servers. Operation 702 reads the audio signals in real-time, determines the audio signal properties, and emits simplified signals which can be used to drive metering visualizations, such as instantaneous level of the overall signal and its frequency components.

At operation 704, the operational control flow 700 maps a digital visualization of the audio content onto the virtual model to generate the virtual event. The digital visualization of the event is substantially similar to the digital representation of the event as described above in FIGS. 2 to 6. The virtual model of operation 704 may be an embodiment of the virtual model as described above in FIGS. 2 to 6. In some embodiments, the operational control flow 700 can retrieve and/or generate the virtual model and/or the digital representation of the event, including updating the virtual model based on any modifications to parameters, characteristics, and/or attributes associated with the virtual event. In these embodiments, the operational control flow 700 can map the digital representation of the event, including parameters, characteristics, and/or attributes associated with any real-world effects, onto the virtual model to generate the virtual event in a substantially similar manner as described above in FIGS. 2 to 6.

At operation 706, the operational control flow 700 compares multiple visualizations of audio layouts to illustrate studio-to-venue translation. For example, operation 706 can generate a visualization of a studio layout in which the audio was designed and a visualization of a venue layout in which the audio will be played. By overlaying the multiple audio layouts, the user can view how the audio translates from studio to venue. The user can make any modifications to parameters, characteristics, and/or attributes associated with the virtual event to tailor the event for a specific venue.

At operation 708, the operational control flow 700 generates a virtual event view that combines a static scene of the venue and a light-based beam overlay of a 3D visualization of the audio content at a location of the three-dimensional space of the virtual event from operations 704 and/or 706. Operation 708 assesses the source location and audio signal properties of each incoming audio signal to render specific light visualizations, such as direction, color, and shape of the light beam. The location of the three-dimensional space may correspond to a physical location of the venue and therefore the virtual event view at the location corresponds to the real world view at the corresponding physical location at the venue. In the exemplary embodiment illustrated in FIGS. 2 to 6, the operational control flow 700 can process the virtual event from operations 704 and/or 706 as the virtual event is being played back to provide a virtual event view event at the location in a substantially similar manner as described above in FIGS. 2 to 6. In some embodiments, the generated virtual event view may also be based on parameters, characteristics, and/or attributes established or modified by user devices as described above in FIGS. 2 to 6. For example, the visual graphical elements of the generated virtual event view may represent simulated behavior of one or more parameters, characteristics, and/or attributes associated with the virtual event.

At operation 710, the operational control flow 700 can receive audio metering interactions from user devices as described above in FIGS. 2 to 6 in the form of user input and represent these interactions in the virtual event view from operation 708. The operational control flow 700 can play the virtual event from operations 704 and/or 706 to virtually simulate the event being presented at the venue. The operational control flow 700 can receive user input from user devices as described above in FIGS. 2 to 6 as the virtual event view from operation 708 is being viewed (e.g., on a display of user devices as described above in FIGS. 2 to 6). In some embodiments, this user input can include instructions (e.g., from an input device of user devices as described above in FIGS. 2 to 6) for virtually moving virtual users around the three-dimensional space of the virtual event from operation 704 to view the digital representation of the event at one or more locations of the three-dimensional space of the virtual event from operation 704. In some embodiments, this interaction can include virtually modifying one or more parameters, characteristics, and/or attributes of the virtual event from operations 704 and/or 706 as the virtual event view from operation 708 is being viewed in a substantially similar manner as described above in FIGS. 2 to 6. The one or more parameters, characteristics, and/or attributes of operation 710 are substantially similar to and represent one embodiment of the one or more parameters, characteristics, and/or attributes as described above in FIGS. 2 to 6. The modification can be propagated to the audio system of the venue to configure the audio properties. In some embodiments, the operational control flow 700 can update the virtual event from operations 704 and/or 706 to reflect the modification to the one or more parameters, characteristics, and/or attributes of the virtual event from operations 704 and/or 706. For example, the operational control flow 700 may update one or more virtual graphical elements of virtual event view to reflect any modifications to one or more parameters, characteristics, and/or attributes of the virtual event. In these embodiments, the operational control flow 700 can propagate the modification to multiple user devices to allow these multiple user devices to collaboratively interact with the virtual event from operations 704 and/or 706. In some embodiments, instead of distributing the updated virtual event, the operational control flow 700 can transmit the one or more modifications to the user devices as described above in FIGS. 2 to 6. Each user device may then locally update the virtual event based on the received modification(s).

Figure 8:
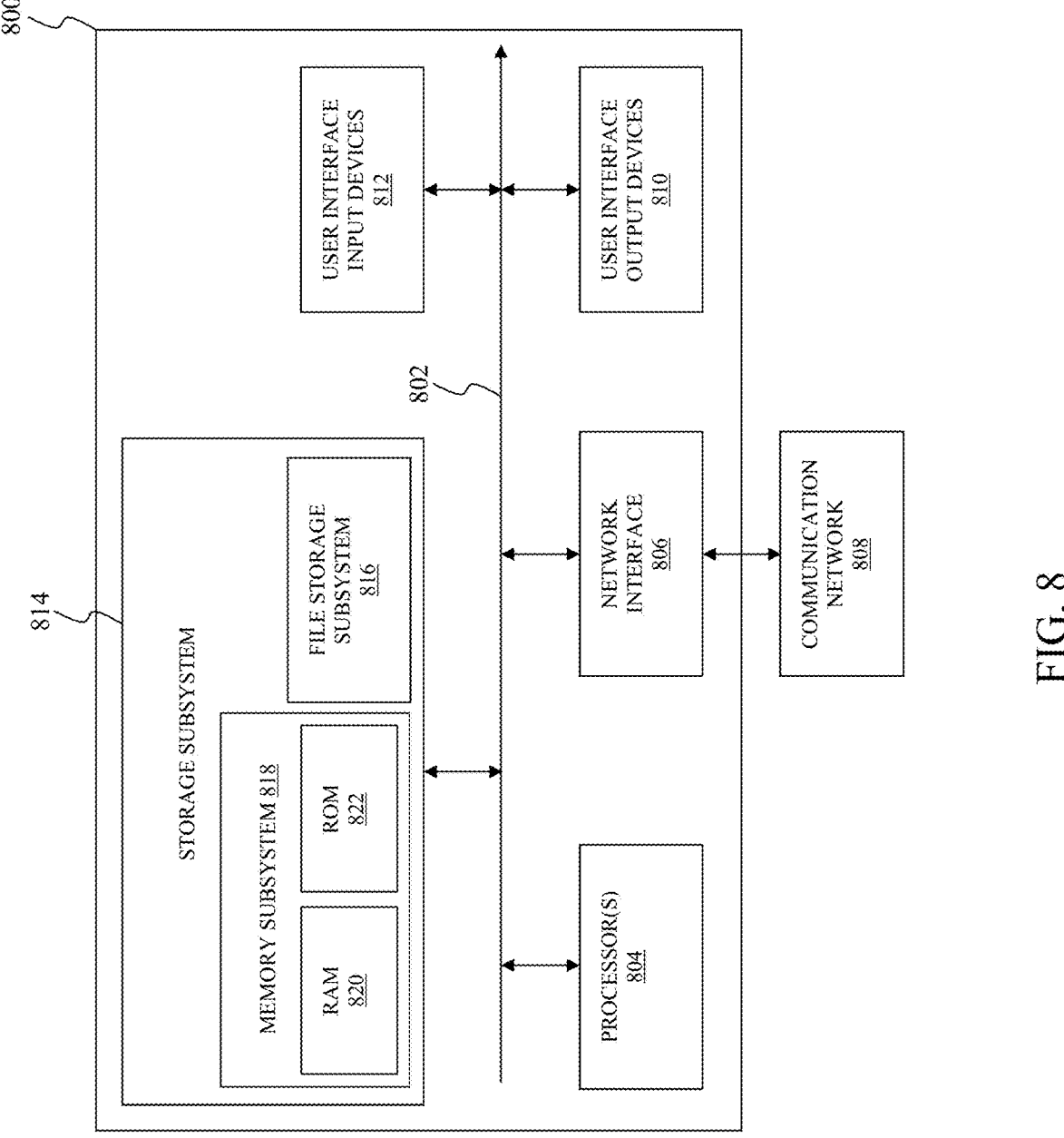
FIG. 8 illustrates a simplified block diagram of a computer system suitable for use with embodiments described herein according to some exemplary embodiments of the present disclosure.

Exemplary Computer System that can be Utilized to Implement Electronic Devices within the Exemplary Venue FIG. 8 illustrates a simplified block diagram of a computer system suitable for use with embodiments described herein according to some exemplary embodiments of the present disclosure. The various electronic devices, for example, the user devices 204 and 304.*n* as described above in FIGS. 2 and 3, the user devices 404 and 504.*n* as described above in FIGS. 4 and 5, and/or the user device 600 as described above in FIG. 6, can be implemented in hardware, firmware, software, or any combination thereof. The discussion of FIG. 8 to follow describes an exemplary computer system 800 that can be used for these electronic devices.

In the exemplary embodiment illustrated in FIG. 8, the computer system 800 typically includes at least one processor 804 which communicates with a number of peripheral devices via bus subsystem 802. Typically, the at least one processor 804 can include, or can be, any of a microprocessor, graphics processing unit, or digital signal processor, and their electronic processing equivalents, such as an Application Specific Integrated Circuit ("ASIC") or Field Programmable Gate Array ("FPGA"). As used herein, the term "processor" signifies a tangible data and information processing device that physically transforms data and information, typically using a sequence transformation (also referred to as "operations"). Data and information can be physically represented by an electrical, magnetic, optical or acoustical signal that is capable of being stored, accessed, transferred, combined, compared, or otherwise manipulated by the processor. The term "processor" can signify a singular processor and multi-core systems or multi-processor arrays, including graphic processing units, digital signal processors, digital processors or combinations of these elements. The processor can be electronic, for example, comprising digital logic circuitry (for example, binary logic), or analog (for example, an operational amplifier). The processor may also operate to support performance of the relevant operations in a "cloud computing" environment or as a "software as a service" (SaaS). For example, at least some of the operations may be performed by a group of processors available at a distributed or remote system, these processors accessible via a communications network (e.g., the Internet) and via one or more software interfaces (e.g., an application program interface (API).)

The computer system 800 typically includes an operating system, such as Microsoft's Windows, Sun Microsystems's Solaris, Apple Computer's MacOs, Linux or UNIX. The computer system 800 also typically can include a Basic Input/Output System (BIOS) and processor firmware. The operating system, BIOS and firmware are used by the processor to control subsystems and interfaces coupled to the processor. Typical processors compatible with these operating systems include the Pentium and Itanium from Intel, the Opteron and Athlon from Advanced Micro Devices, and the ARM processor from ARM Holdings.

As illustrated in FIG. 8, these peripheral devices may include user interface input devices 812, user interface output devices 810, a network interface subsystem 806, and a storage subsystem 814, comprising a file storage subsystem 816 and a memory subsystem 818. The input and output devices allow user interaction with computer system 800. In the exemplary embodiment illustrated in FIG. 8, the network interface subsystem 806 provides an interface to outside networks, including an interface to a communication network 808, and is coupled via a communication network 808 to corresponding interface devices in other computer systems or machines. The communication network 808 may comprise many interconnected computer systems, machines, and communication links. These communication links may be wired links, optical links, wireless links, or any other devices for communication of information. The communication network 808 can be any suitable computer network, for example a wide area network such as the Internet, and/or a local area network such as Ethernet. The communication network 808 can be wired and/or wireless, and the communication network can use encryption and decryption methods, such as is available with a virtual private network. The communication network uses one or more communications interfaces, which can receive data from, and transmit data to, other systems. Embodiments of communications interfaces typically include an Ethernet card, a modem (e.g., telephone, satellite, cable, or ISDN), (asynchronous) digital subscriber line (DSL) unit, Firewire interface, USB interface, and the like. One or more communications protocols can be used, such as HTTP, TCP/IP, RTP/RTSP, IPX and/or UDP.

The user interface input devices 812 may include an alphanumeric keyboard, a keypad, pointing devices such as a mouse, trackball, touchpad, stylus, or graphics tablet, a scanner, a touchscreen incorporated into the display, audio input devices such as voice recognition systems or microphones, eye-gaze recognition, brainwave pattern recognition, and other types of input devices. Such devices can be connected by wire or wirelessly to the computer system 800. In general, use of the term "input device" is intended to include all possible types of devices and ways to input information into the computer system 800 or onto the communication network 808. The user interface input devices 812 typically allow a user to select objects, icons, text and the like that appear on some types of user interface output devices, for example, a display subsystem.

The user interface output devices 810 may include a display subsystem, a printer, a fax machine, or non-visual displays such as audio output devices. The display subsystem may include a cathode ray tube (CRT), a flat-panel device such as a liquid crystal display (LCD), a projection device, or some other device for creating a visible image such as a virtual reality system. The display subsystem may also provide non-visual display such as via audio output or tactile output (e.g., vibrations) devices. In general, use of the term "output device" is intended to include all possible types of devices and ways to output information from the computer system 800 to the user or to another machine or computer system.

The memory subsystem 818 typically includes a number of memories including a main random-access memory ("RAM") 820 (or other volatile storage device) for storage of instructions and data during program execution and a read-only memory ("ROM") 822 in which fixed instructions are stored. The file storage subsystem 816 provides persistent storage for program and data files, and may include a hard disk drive, a floppy disk drive along with associated removable media, a CD-ROM drive, an optical drive, a flash memory, or removable media cartridges. The databases and modules implementing the functionality of certain embodiments may be stored by file storage subsystem 816.

The bus subsystem 802 provides a device for letting the various components and subsystems of the computer system 800 communicate with each other as intended. Although the bus subsystem 802 is shown schematically as a single bus, alternative embodiments of the bus subsystem may use multiple busses. For example, RAM-based main memory can communicate directly with file storage systems using Direct Memory Access ("DMA") systems.

CONCLUSION

The Detailed Description referred to accompanying figures to illustrate exemplary embodiments consistent with the disclosure. References in the disclosure to "an exemplary embodiment" indicates that the exemplary embodiment described can include a particular feature, structure, or characteristic, but every exemplary embodiment may not necessarily include the particular feature, structure, or characteristic. Moreover, such phrases are not necessarily referring to the same exemplary embodiment. Further, any feature, structure, or characteristic described in connection with an exemplary embodiment can be included, independently or in any combination, with features, structures, or characteristics of other exemplary embodiments whether or not explicitly described.

The Detailed Description is not meant to limiting. Rather, the scope of the disclosure is defined only in accordance with the following claims and their equivalents. It is to be appreciated that the Detailed Description section, and not the Abstract section, is intended to be used to interpret the claims. The Abstract section can set forth one or more, but not all exemplary embodiments, of the disclosure, and thus, are not intended to limit the disclosure and the following claims and their equivalents in any way.

The exemplary embodiments described within the disclosure have been provided for illustrative purposes and are not intended to be limiting. Other exemplary embodiments are possible, and modifications can be made to the exemplary embodiments while remaining within the spirit and scope of the disclosure. The disclosure has been described with the aid of functional building blocks illustrating the implementation of specified functions and relationships thereof. The boundaries of these functional building blocks have been arbitrarily defined herein for the convenience of the description. Alternate boundaries can be defined so long as the specified functions and relationships thereof are appropriately performed.

Embodiments of the disclosure can be implemented in hardware, firmware, software application, or any combination thereof. Embodiments of the disclosure can also be implemented as instructions stored on a machine-readable medium, which can be read and executed by one or more processors. A machine-readable medium can include any mechanism for storing or transmitting information in a form readable by a machine (e.g., a computing circuitry). For example, a machine-readable medium can include non-transitory machine-readable mediums such as read only memory (ROM); random access memory (RAM); magnetic disk storage media; optical storage media; flash memory devices; and others. As another example, the machine-readable medium can include transitory machine-readable medium such as electrical, optical, acoustical, or other forms of propagated signals (e.g., carrier waves, infrared signals, digital signals, etc.). Further, firmware, software application, routines, instructions can be described herein as performing certain actions. However, it should be appreciated that such descriptions are merely for convenience and that such actions in fact result from computing devices, processors, controllers, or other devices executing the firmware, software application, routines, instructions, etc.

The Detailed Description of the exemplary embodiments fully revealed the general nature of the disclosure that others can, by applying knowledge of those skilled in relevant art(s), readily modify and/or adapt for various applications such exemplary embodiments, without undue experimentation, without departing from the spirit and scope of the disclosure. Therefore, such adaptations and modifications are intended to be within the meaning and plurality of equivalents of the exemplary embodiments based upon the teaching and guidance presented herein. It is to be understood that the phraseology or terminology herein is for the purpose of description and not of limitation, such that the terminology or phraseology of the present specification is to be interpreted by those skilled in relevant art(s) in light of the teachings herein.

What is claimed is:

1. A computer-implemented method, comprising:
   generating, by a user device, a graphical user interface (GUI) comprising virtual graphical elements configured to indicate at least one of a temporal property, a spectral property, or a spatial property of one or more sound sources;

receiving, at the user device via the GUI, a user input that sets one or more parameters, characteristics, or attributes of the one or more sound sources;
   in response to receiving the user input, displaying, by the user device, a first projection of visible light beams configured to illustrate coverage areas of corresponding acoustic waves generated by the one or more sound sources, wherein the coverage areas include at least one of a gap or an overlap in coverage;
   receiving, at the user device via the GUI, a modification input that adjusts the one or more parameters, characteristics, or attributes of the one or more sound sources such that a coverage modification of the gap or the overlap occurs;
   in response to receiving the modification input, displaying, by the user device, a second projection of the visible light beams configured to illustrate the coverage modification of the gap or the overlap; and
   updating, by the user device, the virtual graphical elements of the GUI to reflect the modification input.

2. The computer-implemented method of claim 1, wherein the generating the GUI comprises generating the virtual graphical elements comprising at least one of a loudness meter, a decibel value, a frequency meter, an equalization control, or a spatial indicator.

3. The computer-implemented method of claim 1, wherein the displaying the second projection of the visible light beams comprises displaying a visualization of the coverage modification that fills the gap or eliminates the overlap.

4. The computer-implemented method of claim 1, wherein the generating the GUI comprises generating the virtual graphical elements as an overlay over real-world elements of a venue.

5. The computer-implemented method of claim 1, wherein the receiving the user input comprises receiving at least one of a first gesture input, a first voice input, or a first physical input at the user device; and
   wherein the receiving the modification input comprises receiving at least one of a second gesture input, a second voice input, or a second physical input at the user device.

6. The computer-implemented method of claim 1, further comprising:
   receiving, at the user device, measurement information of the acoustic waves detected by a microphone; and
   updating, by the user device, the virtual graphical elements based on the measurement information;
   wherein the receiving the modification input occurs in response to the displaying the first projection or the updating the virtual graphical elements based on the measurement information.

7. The computer-implemented method of claim 6, wherein the receiving the measurement information comprises receiving at least one of a measured sound pressure level, a measured frequency response, or a measured coverage of the acoustic waves detected by the microphone.

8. A processing device, comprising:
   a memory configured to store instructions; and
   a processor configured to execute the instructions stored in the memory such that the instructions cause the processor to perform operations comprising:
      generating, by a user device, a graphical user interface (GUI) comprising virtual graphical elements configured to indicate at least one of a temporal property, a spectral property, or a spatial property of one or more sound sources;

receiving, at the user device via the GUI, a user input that sets one or more parameters, characteristics, or attributes of the one or more sound sources;

in response to receiving the user input, displaying, by the user device, a first projection of visible light beams configured to illustrate coverage areas of corresponding acoustic waves generated by the one or more sound sources, wherein the coverage areas include at least one of a gap or an overlap in coverage;

receiving, at the user device via the GUI, a modification input that adjusts the one or more parameters, characteristics, or attributes of the one or more sound sources such that a coverage modification of the gap or the overlap occurs;

in response to receiving the modification input, displaying, by the user device, a second projection of the visible light beams configured to illustrate the coverage modification of the gap or the overlap; and updating, by the user device, the virtual graphical elements of the GUI to reflect the modification input.

9. The processing device of claim 8, wherein the generating the GUI comprises generating the virtual graphical elements comprising at least one of a loudness meter, a decibel value, a frequency meter, an equalization control, or a spatial indicator.

10. The processing device of claim 8, wherein the displaying the second projection of the visible light beams comprises displaying a visualization of the coverage modification that fills the gap or eliminates the overlap.

11. The processing device of claim 8, wherein the generating the GUI comprises generating the virtual graphical elements as an overlay over real-world elements of a venue.

12. The processing device of claim 8, wherein the receiving the user input comprises receiving at least one of a first gesture input, a first voice input, or a first physical input at the user device; and wherein the receiving the modification input comprises receiving at least one of a second gesture input, a second voice input, or a second physical input at the user device.

13. The processing device of claim 8, wherein the operations further comprise:

receiving, at the user device, measurement information of the acoustic waves detected by a microphone; and updating, by the user device, the virtual graphical elements based on the measurement information;

wherein the receiving the modification input occurs in response to the displaying the first projection or the updating the virtual graphical elements based on the measurement information.

14. The processing device of claim 13, wherein the receiving the measurement information comprises receiving at least one of a measured sound pressure level, a measured frequency response, or a measured coverage of the acoustic waves detected by the microphone.

15. A non-transitory computer-readable device having instructions stored thereon that, when executed by at least one computing device, causes the at least one computing device to perform operations comprising:

generating, by a user device, a graphical user interface (GUI) comprising virtual graphical elements configured to indicate at least one of a temporal property, a spectral property, or a spatial property of one or more sound sources;

receiving, at the user device via the GUI, a user input that sets one or more parameters, characteristics, or attributes of the one or more sound sources;

in response to receiving the user input, displaying, by the user device, a first projection of visible light beams configured to illustrate coverage areas of corresponding acoustic waves generated by the one or more sound sources, wherein the coverage areas include at least one of a gap or an overlap in coverage;

receiving, at the user device via the GUI, a modification input that adjusts the one or more parameters, characteristics, or attributes of the one or more sound sources such that a coverage modification of the gap or the overlap occurs;

in response to receiving the modification input, displaying, by the user device, a second projection of the visible light beams configured to illustrate the coverage modification of the gap or the overlap; and updating, by the user device, the virtual graphical elements of the GUI to reflect the modification input.

16. The non-transitory computer-readable device of claim 15, wherein the generating the GUI comprises generating the virtual graphical elements comprising at least one of a loudness meter, a decibel value, a frequency meter, an equalization control, or a spatial indicator.

17. The non-transitory computer-readable device of claim 15, wherein the displaying the second projection of the visible light beams comprises displaying a visualization of the coverage modification that fills the gap or eliminates the overlap.

18. The non-transitory computer-readable device of claim 15, wherein the generating the GUI comprises generating the virtual graphical elements as an overlay over real-world elements of a venue.

19. The non-transitory computer-readable device of claim 15, wherein the receiving the user input comprises receiving at least one of a first gesture input, a first voice input, or a first physical input at the user device; and wherein the receiving the modification input comprises receiving at least one of a second gesture input, a second voice input, or a second physical input at the user device.

20. The non-transitory computer-readable device of claim 15, wherein the operations further comprise:

receiving, at the user device, measurement information of the acoustic waves detected by a microphone; and updating, by the user device, the virtual graphical elements based on the measurement information;

wherein the receiving the modification input occurs in response to the displaying the first projection or the updating the virtual graphical elements based on the measurement information; and wherein the measurement information comprises at least one of a measured sound pressure level, a measured frequency response, or a measured coverage of the acoustic waves detected by the microphone.

* * * * *